(12) United States Patent
O'Brien, III et al.

(10) Patent No.: US 11,290,321 B1
(45) Date of Patent: Mar. 29, 2022

(54) EXPANDED AVAILABILITY COMPUTING SYSTEM

(71) Applicant: Dell Products L.P., Round Rock, TX (US)

(72) Inventors: Walter A. O'Brien, III, Westborough, MA (US); William Emmett Lynn, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/082,519

(22) Filed: Oct. 28, 2020

(51) Int. Cl.
*G06F 15/173* (2006.01)
*H04L 41/0803* (2022.01)
*G06F 13/42* (2006.01)

(52) U.S. Cl.
CPC ...... *H04L 41/0803* (2013.01); *G06F 13/4221* (2013.01); *G06F 2213/0026* (2013.01)

(58) Field of Classification Search
CPC ............. H04L 41/0803; G06F 13/4221; G06F 2213/0026
USPC ........................................................ 709/223
See application file for complete search history.

(56) References Cited

U.S. PATENT DOCUMENTS

| | | | | |
|---|---|---|---|---|
| 8,793,379 | B2 * | 7/2014 | Upadhya | G06F 9/5072 709/226 |
| 9,043,283 | B2 * | 5/2015 | McBrearty | G06F 16/273 707/655 |
| 9,471,121 | B2 | 10/2016 | Saha et al. | |
| 9,529,400 | B1 | 12/2016 | Kumar et al. | |
| 10,063,429 | B2 * | 8/2018 | Caison | H04L 63/0227 |
| 10,191,852 | B2 * | 1/2019 | Petkov | G06F 12/1441 |
| 10,715,411 | B1 | 7/2020 | Jacob Da Silva et al. | |
| 10,783,108 | B2 * | 9/2020 | Hagimont | G06F 16/182 |
| 2002/0156613 | A1 | 10/2002 | Geng et al. | |
| 2017/0102952 | A1 | 4/2017 | Khemani et al. | |

OTHER PUBLICATIONS

PCT International Search Report and Written Opinion, Application No. PCT/US2021/029754, dated Jul. 14, 2021, 16 pages.

* cited by examiner

*Primary Examiner* — Alicia Baturay
(74) *Attorney, Agent, or Firm* — Joseph Mencher

(57) ABSTRACT

An expanded availability computing system includes a first and second computing systems coupled together via a network. The first computing system includes a device access controller subsystem coupled to devices and a central processing subsystem that is configured to provide Software Defined Service(s) (SDS(s)) using the devices via the device access controller subsystem. A networking subsystem coupled to the device access controller subsystem determines that the at least one SDS is unavailable, configures the device access controller subsystem to receive SDS communications from the networking subsystem, enables remote access for the second computing system via the networking subsystem and through device access controller subsystem to the devices, and transmits SDS communications received from the second computing system to the devices via the device access controller subsystem so that the second computing device provides the SDS(s) using the devices via the device access controller subsystem.

20 Claims, 24 Drawing Sheets

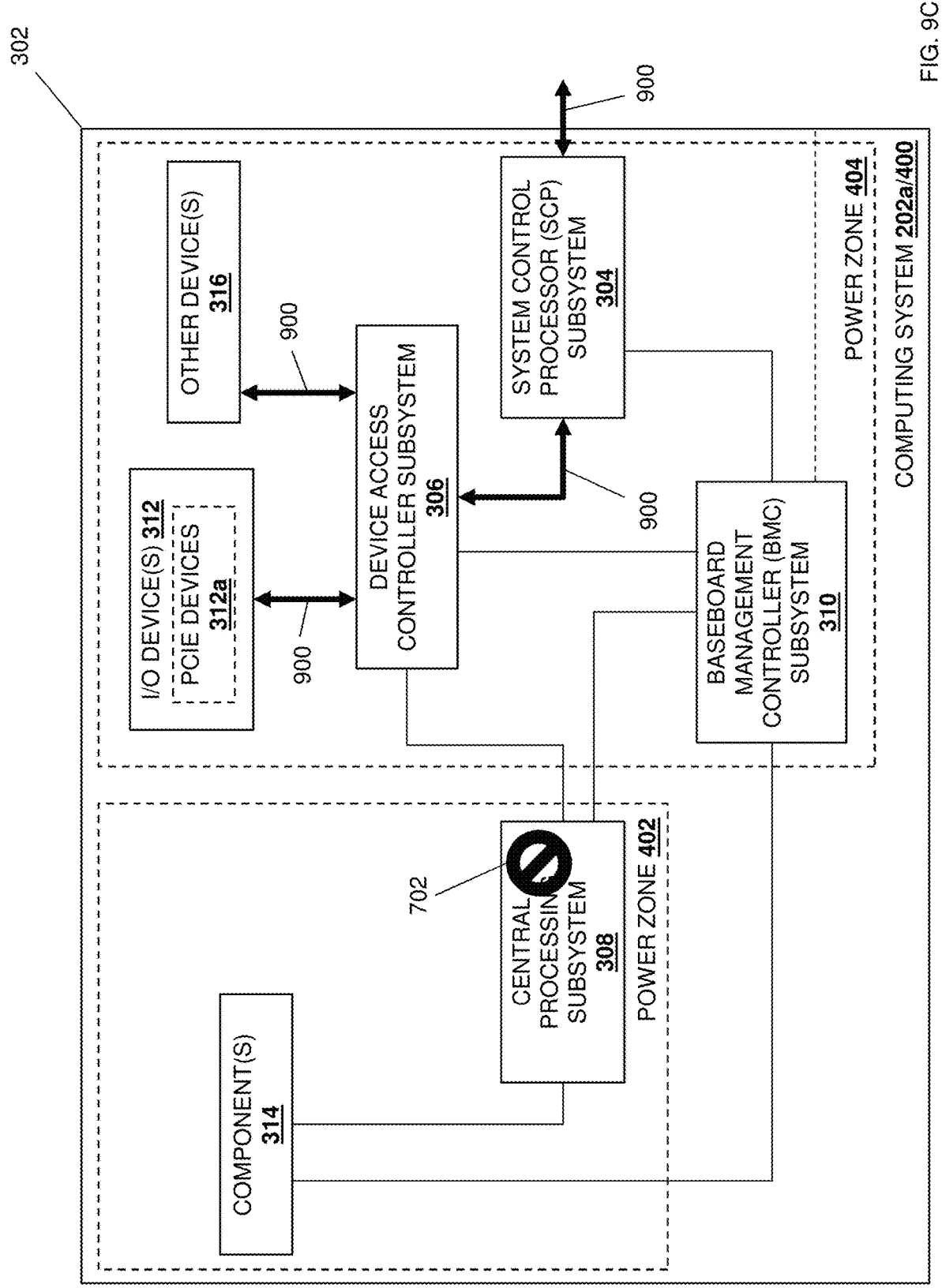

EXPANDED AVAILABILITY COMPUTING SYSTEM

BACKGROUND

The present disclosure relates generally to information handling systems, and more particularly expanding the availability of an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and/or other computing systems known in the art, may be configured to provide Software Defined Services (SDSs) using a variety of server device hardware that may include storage devices (e.g., Hard Disk Drives (HDDs), Solid State Drives (SSDs), etc.), processing devices (e.g., Graphics Processing Units (GPUs)), a variety of Input/Output (I/O) devices (e.g., Peripheral Component Interconnect express (PCIe) devices), and/or other server device hardware that one of skill in the art would recognize as being capable of utilization to provide a variety of SDSs known in the art. However, SDSs can become unavailable due to a variety of situations (e.g., due to the unavailability of a central processing system in the server device that results from a failure, reboot, power loss, or other central processing system issue or operation known in the art), and conventional server devices are configured in a manner that prevents access to the server device hardware in the event that the SDSs is unavailable.

Conventional solutions to these issues are to restart the SDS on a different server device that includes an available central processing system and utilize available service device hardware on that server device to provide the SDS. However, restarting an SDS that was being provided by a first server device on a second server device without any loss of SDS functionality requires backing up data associated with that SDS (e.g., content data stored on storage devices in the first server device, state data associated with components in the first server device, etc.) on a storage system outside of the first server device, and in some cases copying that data to the second server device or accepting the loss of SDS functionality from the SDS that is restarted on the second server device. As such, restarting an SDS on a different server device (or even simply maintaining the ability to restart an SDS on a different server device) consumes storage space, is time-consuming, and presents other issues that would be appreciated by one of skill in the art.

Accordingly, it would be desirable to provide an expanded availability computing system that addresses the issues discussed above.

SUMMARY

According to one embodiment, an Information Handling System (IHS) includes a networking processing subsystem; and a networking memory subsystem that is coupled to the networking processing subsystem and that includes instructions that, when executed by the networking processing subsystem, cause the networking processing subsystem to provide an expanded availability computing system engine that is configured to: determine that at least one Software Defined Service (SDS), which was being provided by a central processing subsystem that is included in the IHS and coupled to the networking processing subsystem via a device access controller subsystem that is included in the IHS, is unavailable; configure the device access controller subsystem to receive SDS communications from the expanded availability computing system engine; enable remote access for a second computing system via a network and the expanded availability computing system engine and through the device access controller subsystem to a plurality of devices that are included in the IHS and coupled to the networking processing subsystem via the device access controller subsystem; and transmit SDS communications received from the second computing system to the plurality of devices via the device access controller subsystem in order to allow the second computing device to provide the at least one SDS using the plurality of devices via the device access controller subsystem.

BRIEF DESCRIPTION OF THE DRAWINGS

FIG. 9C is a schematic view illustrating an embodiment of the computing system of FIGS. 4A and 4B operating during the method of FIG. 6.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more storage devices (e.g., disk drives such as Hard Disk Drives (HDDs), Solid State Drives (SSDs), and/or other storage devices known in the art), one or more network ports for communicating with external devices as well as various input and output (I/O) devices, such as a keyboard, a mouse, a touchscreen and/or a video display, large SSDs, Graphics Processing Units (GPUs), Tensor Processing Units (TPUs), Field Programmable Gate Arrays (FPGAs), and/or other I/O devices known in the art. The information handling system may also include one or more buses operable to transmit communications between the various hardware components.

Figure 1:
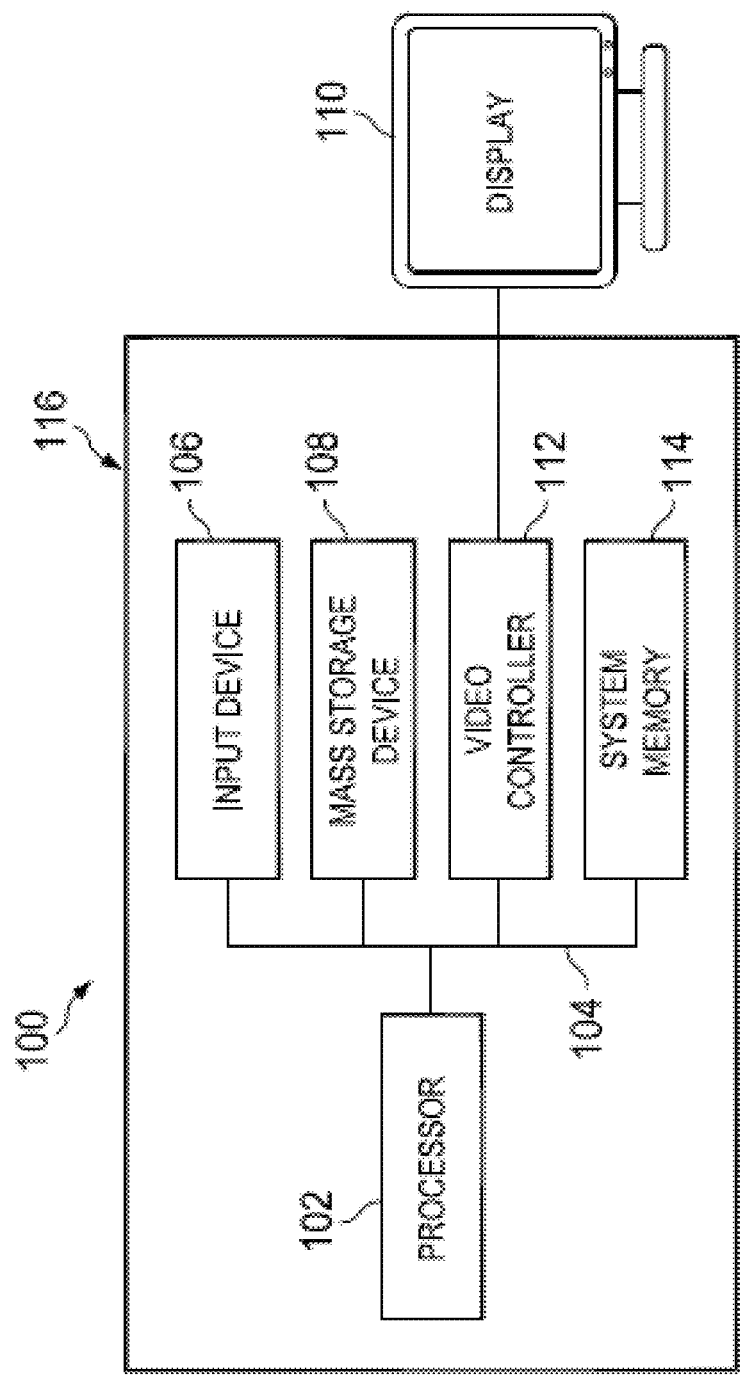
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
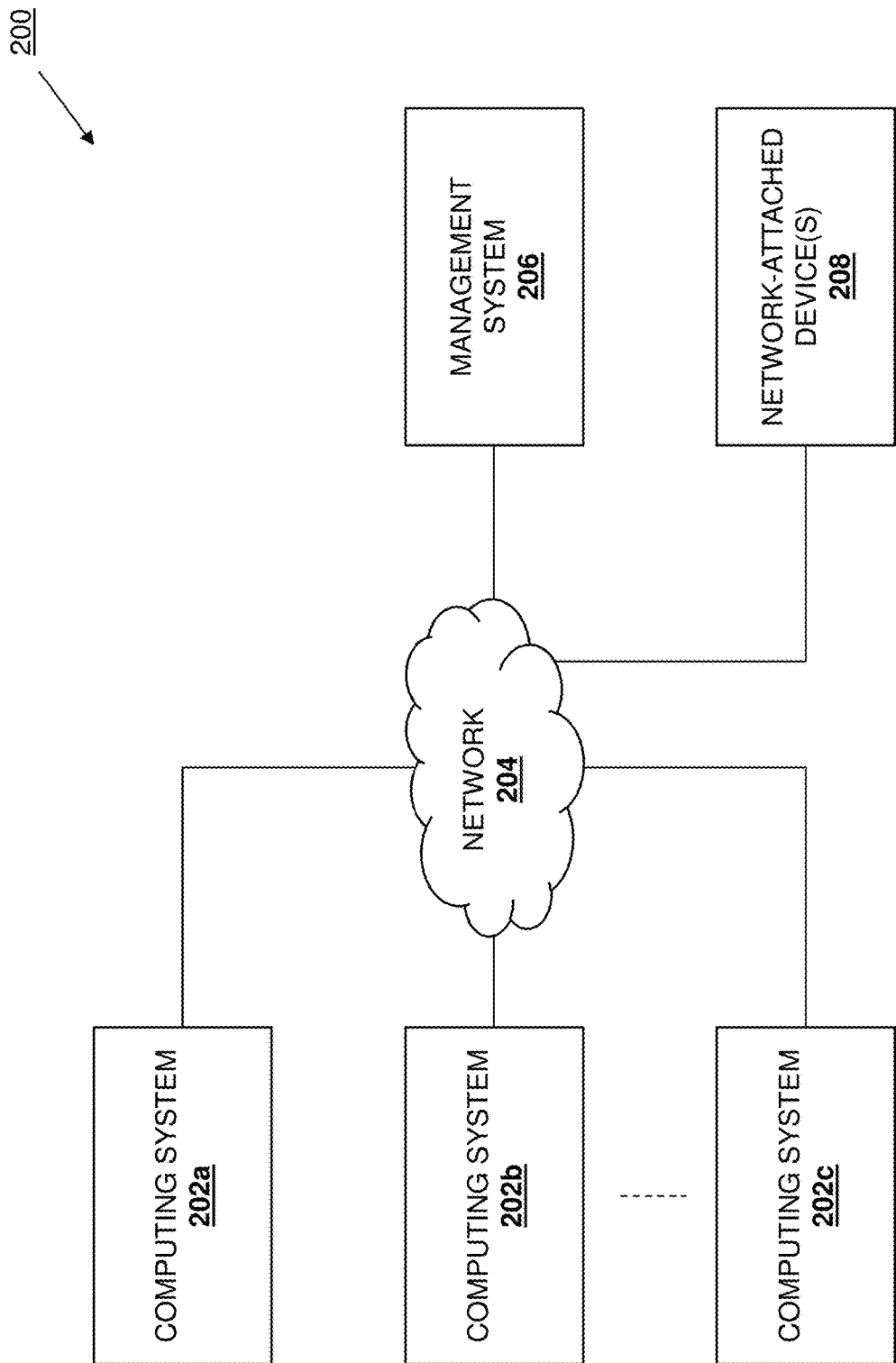
FIG. 2 is a schematic view illustrating an embodiment of a networked system.

Referring now to FIG. 2, an embodiment of a networked system 200 is illustrated in which the expanded availability computing system of the present disclosure may be utilized. In the illustrated embodiment, the networked system 200 includes a plurality of computing systems 202a, 202b, and up to 202c. In an embodiment, the computing system 202a-202c may be provided by the IHS 100 discussed above with reference to FIG. 1, and/or may include some or all of the components of the IHS 100, and in specific examples may be provided by server devices. However, while discussed as being provided by server devices, one of skill in the art in possession of the present disclosure will recognize that computing systems provided in the networked system 200 may include any computing systems that may be configured to operate similarly as the computing systems 202a-202c discussed below. In the illustrated embodiment, each of the computing systems may be coupled to a network 204 that may be provided by a Local Area Network (LAN), the Internet, combinations thereof, and/or any other networks that would be apparent to one of skill in the art in possession of the present disclosure. In some examples, the network 204 may include a first network for management data traffic and a second network for other data traffic, while in other examples, the network 204 may provide for both the management data traffic and other data traffic.

In the illustrated embodiment, a management system 206 is also coupled to the network 204. In an embodiment, the management system 206 may be provided by the IHS 100 discussed above with reference to FIG. 1, and/or may include some or all of the components of the IHS 100, and in specific examples may be provided by one or more management server devices that may be configured to perform management functionality for the computing systems 202a-202c. In the illustrated embodiment, one or more network-attached devices 208 are also coupled to the network 204. In an embodiment, the network-attached device(s) 208 may be provided by a variety of different network-attached devices that are accessible to the computing systems 202a-202c via the network 204, and in specific examples below are discussed as being provided by one or more Non-Volatile Memory express (NVMe) storage devices that may be configured to provide a network-attached storage system for any or all of the computing systems 202a-202c. However, while a specific networked system 200 has been illustrated and described, one of skill in the art in possession of the present disclosure will recognize that the expanded availability computing system of the present disclosure may be utilized with a variety of components and component configurations, and/or may be provided in a variety of computing system/network configurations, while remaining within the scope of the present disclosure as well.

Figure 3:
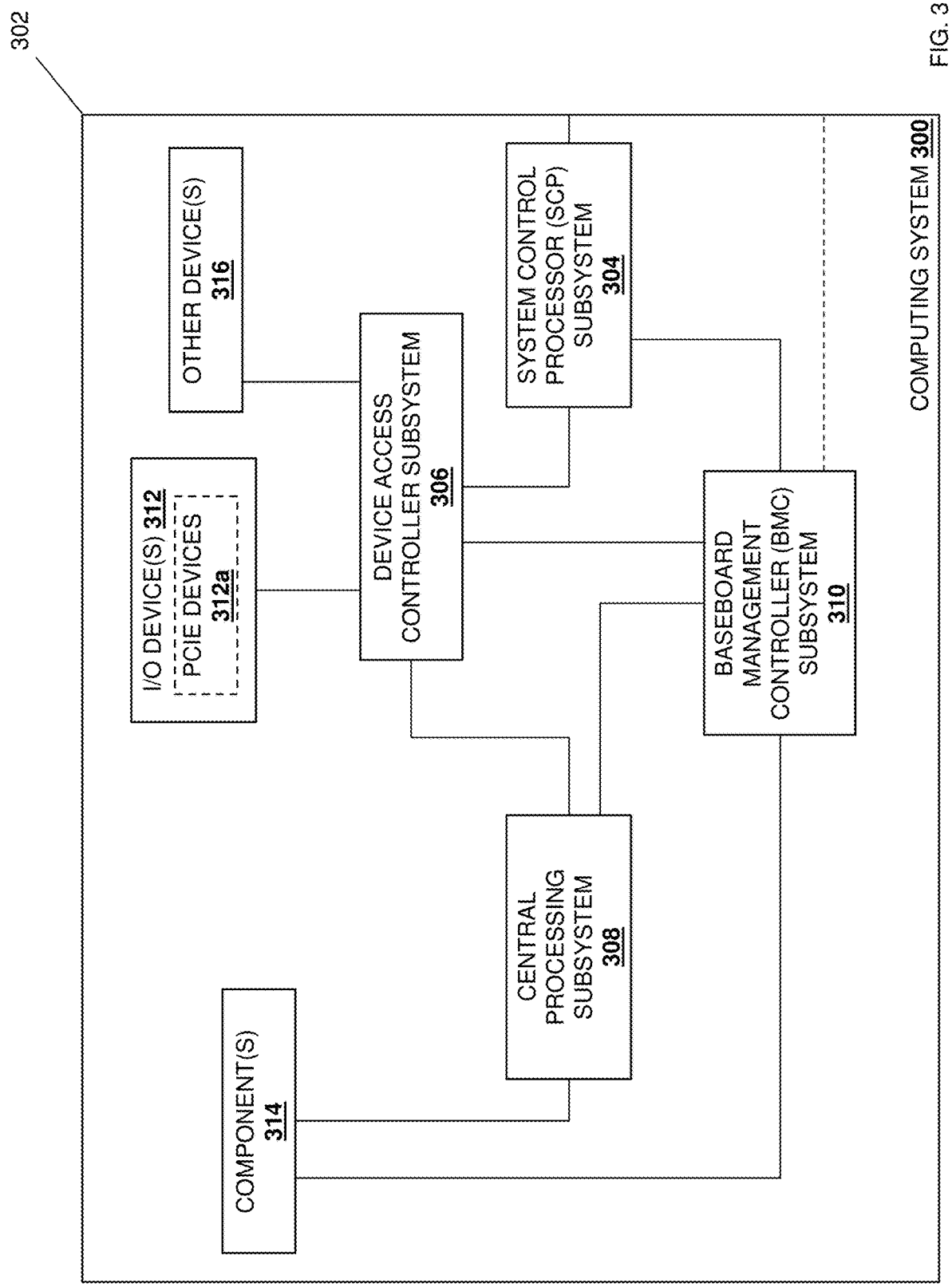
FIG. 3 is a schematic view illustrating an embodiment of a computing system that may be included in the networked system of FIG. 2 and that may utilize the expanded availability functionality of the present disclosure.

Referring now to FIG. 3, an embodiment of a computing system 300 is illustrated that may provide any or all of the computing systems 202a-202c discussed above with reference to FIG. 2. As such, the computing system 300 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing system 300 discussed below may be provided by other computing systems that are configured to operate similarly as the computing system 300 discussed below. In the illustrated embodiment, the computing system 300 includes a chassis 302 that houses the components of the computing system 300, only some of which are illustrated and discussed below.

For example, the chassis 302 may house a networking subsystem that, in the embodiments illustrated and discussed below, is provided by a System Control Processor (SCP) subsystem 304 that is provided according to the teachings of the present disclosure to perform the expanded availability functionality that is discussed in further detail below. In some examples, the SCP subsystem 304 may be conceptualized as an "enhanced" SmartNIC device that may be configured to perform functionality that is not available in conventional SmartNIC devices such as, for example, the platform root-of-trust functionality described by the inventors of the present disclosure in U.S. patent application Ser. No. 17/027,835, filed on Sep. 22, 2020, the disclosure of which is incorporated herein by reference in its entirety. However, while the networking subsystem that enables the expanded availability functionality according to the teachings of the present disclosure is illustrated and described as an enhanced SmartNIC device provided by an SCP subsystem, one of skill in the art in possession of the present disclosure will appreciated that the expanded availability functionality described herein may be enabled on otherwise conventional SmartNIC devices, via NIC devices (along with other components that enable the expanded availability functionality discussed below), and/or using other subsystems while remaining within the scope of the present disclosure as well.

In some alternative examples, the networking subsystem of the present disclosure may be provided by a BMC subsystem discussed in further detail below (e.g., with the SCP subsystem 304 omitted) that operates to provide local device access management to enable the expanded availability functionality discussed below. In another alternative example, the networking subsystem of the present disclosure may be provided by both the SCP subsystem 304 and a BMC subsystem discussed in further detail below, with the SCP subsystem 304 providing a single device management entry point for its computing system 300, and communicating with the BMC subsystem 306 to provide for local device access management, in order to provide the expanded availability functionality discussed below. In yet another alternative example, the networking subsystem of the present disclosure may be provided by both the SCP subsystem 304 and a BMC subsystem discussed in further detail below, with the SCP subsystem 304 providing for both local and remote device access management to provide the expanded availability functionality discussed below. As such, while several specific examples utilizing the SCP subsystem 304 are described below, one of skill in the art in possession of the present disclosure will appreciate that the functionality described below may be provided in other manners (e.g., by a combined SCP/BMC subsystem) while remaining within the scope of the present disclosure as well.

In an embodiment, the SCP subsystem 304 may be provided by the IHS 100 discussed above with reference to FIG. 1 and/or may include some or all of the components of the IHS 100. In specific examples, the SCP subsystem 304 may be provided as an SCP card that is configured to connect to a slot on a motherboard in the chassis 302. In other examples, the SCP subsystem 304 may be integrated into a motherboard in the chassis 302. In yet other examples the SCP subsystem 304 may be a separate/co-motherboard circuit board that is connected to a motherboard in the chassis 302 (e.g., a two-part motherboard having a first portion that enables conventional motherboard functionality, and a second portion that enables the SCP functionality discussed below). However, while a few specific examples are provided, one of skill in the art in possession of the present disclosure will appreciate that the SCP subsystem 304 may be provided in the computing system 300 in a variety of manners that will fall within the scope of the preset disclosure.

The chassis 302 may also house a device access controller subsystem 306 that, in the embodiments illustrated and discussed below, is provided by a fabric switch device. However, in other specific examples, the device access controller subsystem 308 may be provided by a Peripheral Component Interconnect express (PCIe) switch device, a Compute Express Link (CxL) switch device, a Gen-Z switch device, and/or other switch devices, and/or may include components such as protocol bridges and/or other combinations of element between a processing system and the devices which support the device access control capabilities of the present disclosure. As such, the device access controller subsystem 306 may be provided by the IHS 100 discussed above with reference to FIG. 1 and/or may include some or all of the components of the IHS 100 that are configured to perform the switching functionality and/or SDS control communication transmission discussed in further detail below.

The chassis 302 may also house a central processing system 308 that is coupled to the SCP subsystem 304 via the device access controller subsystem 306, and which may include the processor 102 discussed above with reference to FIG. 1, a Central Processing Unit (CPU) such as a x86 host processor, and/or by a variety of other processing components that would be apparent to one of skill in the art in possession of the present disclosure. In the illustrated embodiment, the chassis 302 may also house a Baseboard Management Controller (BMC) subsystem 310 that is coupled to the SCP subsystem 304, and which one of skill in the art in possession of the present disclosure will recognize as being configured to manage an interface between system management software in the computing system 300 and hardware in the computing system 300, as well as perform other BMC operations that would be apparent to one of skill in the art in possession of the present disclosure. As such, the BMC subsystem 310 may be configured to utilize a dedicated management network connection (e.g., illustrated by the dashed line in FIG. 3), or may be configured to utilize a network connection included in the SCP subsystem 304 (e.g., via a Network Communications Services Interface (NCSI) that allows the use of a NIC port on the SCP subsystem 304).

The chassis 302 may also house (or provide a coupling for) one or more Input/Output (I/O) devices 312 that are coupled to the SCP subsystem 304, the central processing system 308j, and the BMC subsystem 310 via the device access controller subsystem 306. As such, one of skill in the art in possession of the present disclosure will recognize that the I/O device(s) 312 may be housed in the chassis 302 and connected to an internal connector (e.g., on a motherboard in the chassis 302) that is coupled to the device access controller subsystem 306, or may be provided external to the chassis 302 and connected to an external connector (e.g., on an outer surface the chassis 302) that is coupled to the device access controller subsystem 306. As illustrated in FIG. 3, the I/O device(s) 312 may include one or more Peripheral Component Interconnect express (PCIe) devices 312a (as the I/O device(s) 312 or in addition to other I/O device(s)). For example, the PCIe device(s) 312a may include NVMe storage devices that are house in the chassis 302 (i.e., and connected to an internal connector on a motherboard in the chassis 302), or that are external to the chassis 302 (i.e., and connected to an external connector on an outer surface of the chassis 302). However, while particular I/O devices and/or PCI devices have been described, one of skill in the art in possession of the present disclosure will recognize that a variety of other I/O devices (e.g., a SAS storage controller) will fall within the scope of the present disclosure as well.

The chassis 302 may also house one or more components 314 that are coupled to the central processing system 308 and the BMC subsystem 310, and one of skill in the art in possession of the present disclosure will appreciate that the coupling of the components 314 to the SCP subsystem 304 via the central processing subsystem 308 may render those components 314 unavailable in the event the central processing subsystem 308 becomes unavailable. As such, in some embodiment, the components 314 may be omitted, or may not be necessary for the performance of Software Defined Services (SDSs) by a remote computing system.

The chassis 302 may also house one or more other devices 316 that are coupled to the SCP subsystem 304, the central processing system 308j, and the BMC subsystem 310 via the device access controller subsystem 306, and one of skill in the art in possession of the present disclosure will appreciate that the coupling of the other device(s) 316 to the SCP subsystem 304 via the device access controller subsystem 306 allows those other device(s) 316 to be made available in the event the central processing subsystem 308 becomes unavailable, as discussed in further detail below. As such, the other device(s) 316 may include any devices utilized in the performance of Software Defined Services (SDSs) such as, for example, GPUs, TPUs, FPGAs, storage devices, and/or other devices known in the art. However, while a specific computing system 300 has been illustrated, one of skill in the art in possession of the present disclosure will recognize that computing systems (or other devices operating according to the teachings of the present disclosure in a manner similar to that described below for the computing system 300) may include a variety of components and/or component configurations for providing conventional computing system functionality, as well as the functionality discussed below, while remaining within the scope of the present disclosure as well. For example, in some embodiments, the BMC subsystem 310 described above with reference to FIG. 3 may be omitted, and the SCP subsystem 304 may be configured to provide a BMC subsystem that performs the functionality of the BMC subsystem 310 in FIG. 3.

Figure 4A:
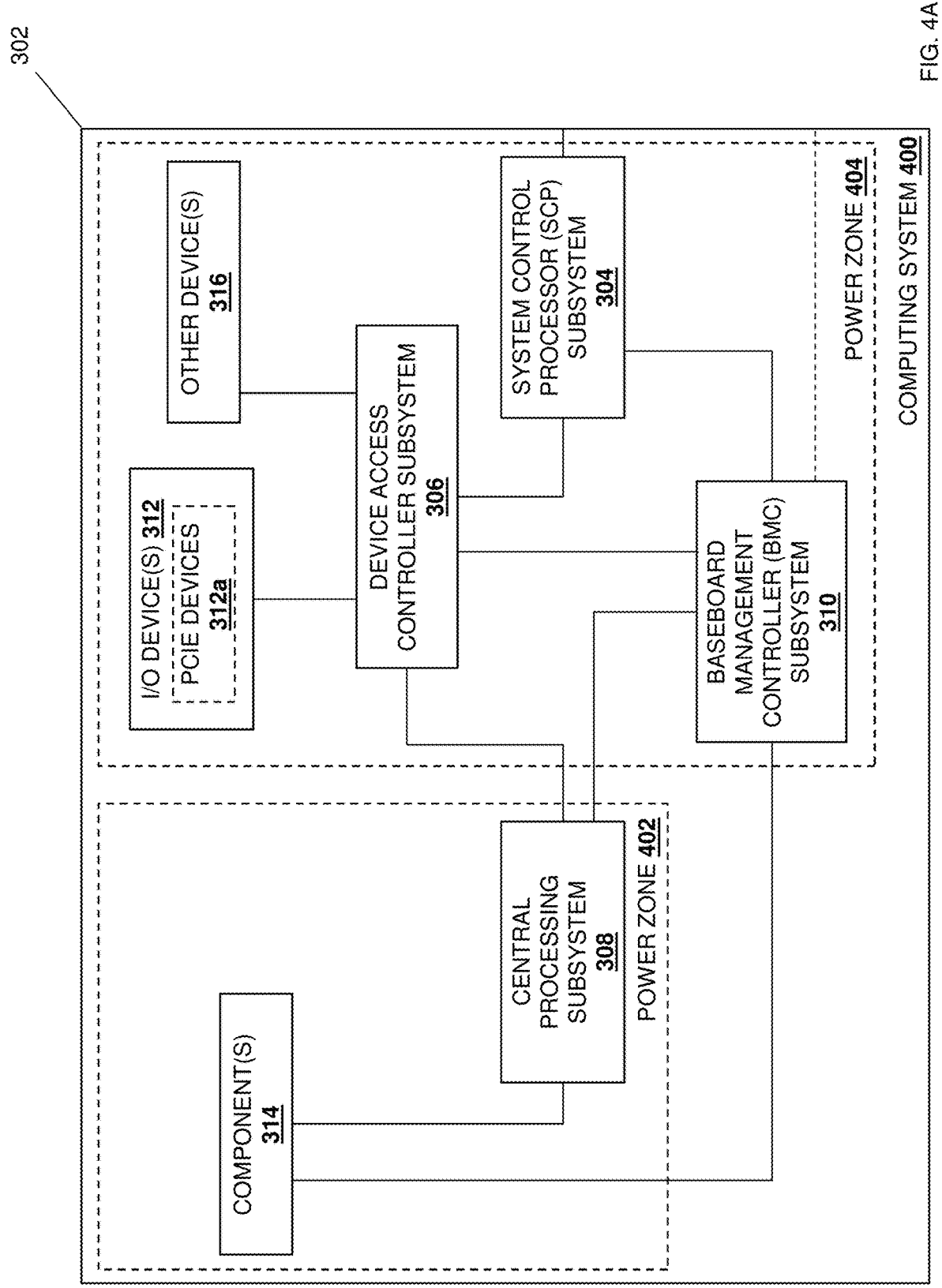
FIG. 4A is a schematic view illustrating an embodiment of a computing system that may be included in the networked system of FIG. 2 and that may utilize the expanded availability functionality of the present disclosure.
Figure 4B:
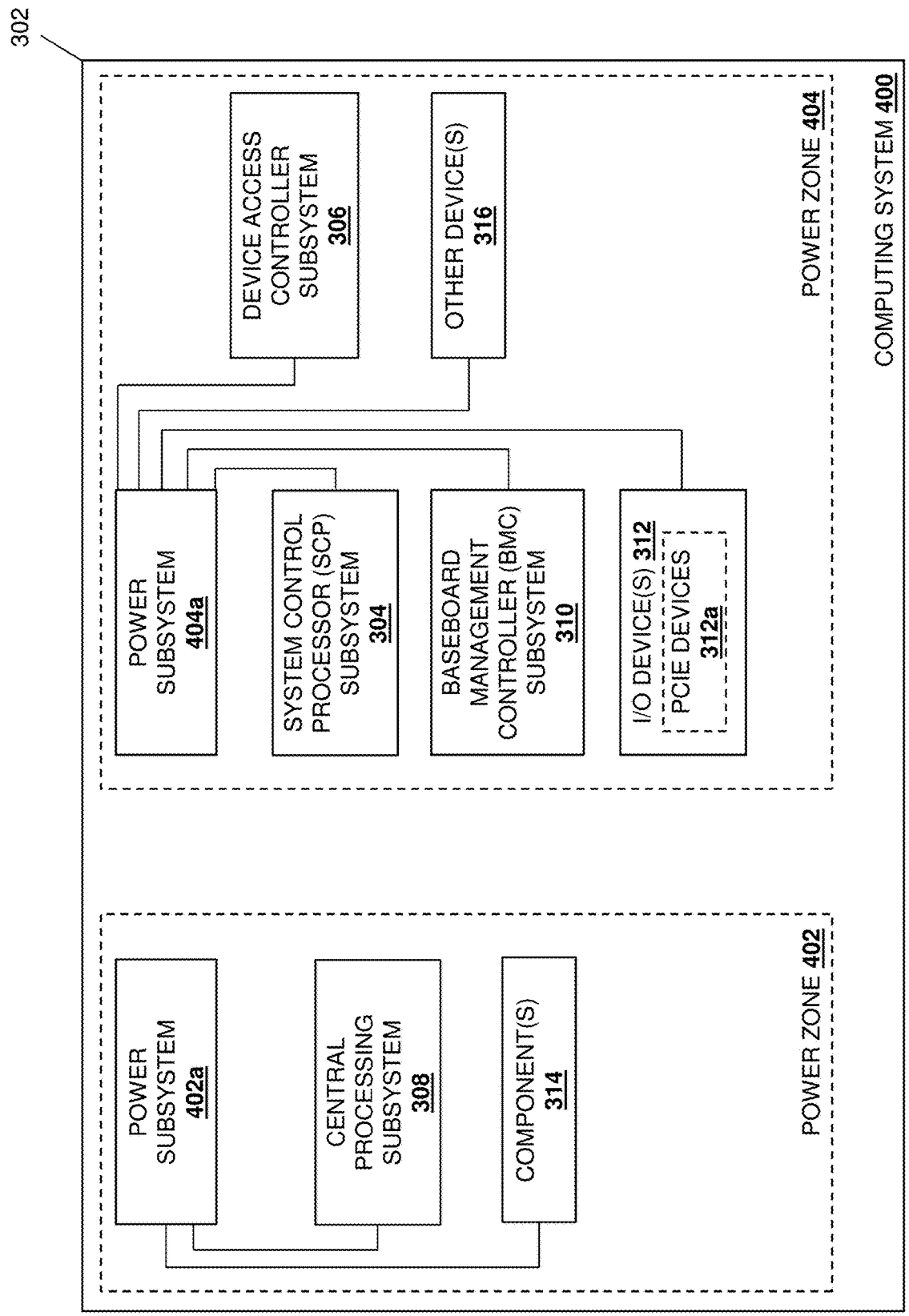
FIG. 4B is a schematic view illustrating an embodiment of the computing system of FIG. 4A.

Referring now to FIGS. 4A and 4B, a computing system 400 is illustrated that provides a particular embodiment of the computing system 300 discussed above with reference to FIG. 3 and, as such, the computing system 400 includes similar elements that are provided with the same reference numbers as the computing system 300 discussed above with reference to FIG. 3. With reference to FIG. 4A, in this embodiment, the central processing subsystem 308 and the component(s) 314 (when present) in the computing system 400 may be provided in a power zone 402, while the SCP subsystem 304, the device access controller subsystem 306, the BMC subsystem 310, the I/O devices 312/PCIe devices 312a, and the other device(s) 316 are included in a power zone 404 that is separate from the power zone 402. As will be appreciated by one of skill in the art in possession of the present disclosure, the separation of the power zones 402 and 404 allows the central processing subsystem 308 and the component(s) 314 (when present) to be powered separately from the SCP subsystem 304, the device access controller subsystem 306, the BMC subsystem 310, the I/O devices 312/PCIe devices 312a, and the other device(s) 316.

FIG. 4B illustrates how, in some embodiments, a power subsystem 402a may be included in the computing system 400 and coupled to each of the central processing subsystem 308 and the component(s) 314 (when present) to provide the power zone 402, while a power subsystem 404a may be included in the computing system 400 and coupled to each of the SCP subsystem 304, the device access controller subsystem 306, the BMC subsystem 310, the I/O devices 312/PCIe devices 312a, and the other device(s) 316 to provide the power zone 404, which one of skill in the art in possession of the present disclosure will recognize allows the power subsystem 404a to continue to power the SCP subsystem 304, the device access controller subsystem 306, the BMC subsystem 310, the I/O devices 312/PCIe devices 312a, and the other device(s) 316 in the event the power subsystem 402a becomes unavailable. For example, the power subsystems 402a and 404a may be provided by separate power subsystems (e.g., separate Power Supply Units (PSUs)), by a single power subsystem (e.g., a PSU) with separate power zone functionality, and/or in any other manner that one of skill in the art in possession of the present disclosure would recognize allows for independent provisioning of power by the power subsystems 402a and 404a to provide the independent the power zones 402 and 404 described herein. However, while the computing system 400 is illustrated and described with multiple independent power zones that provide expanded availability functionality, one of skill in the art in possession of the present disclosure will appreciate that the computing system 300 discussed above with reference to FIG. 3 may utilize a signal power system/power zone for all of its components and still provided some of the expanded availability functionality discussed below while remaining within the scope of the present disclosure as well.

Figure 5:
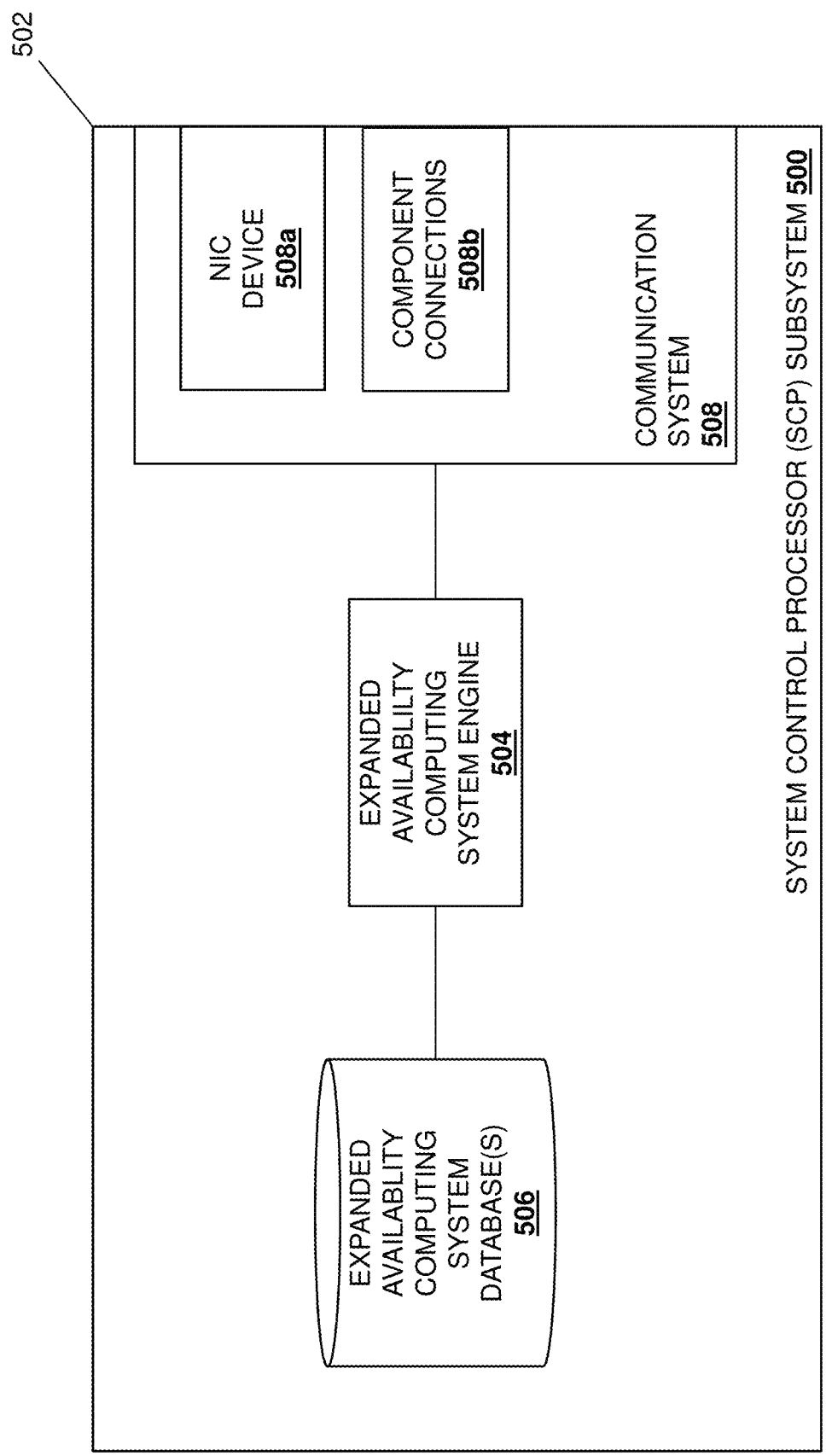
FIG. 5 is a schematic view illustrating an embodiment of a System Control Processor (SCP) subsystem that may be included in the computing system of FIG. 3 or 4A and 4B.

With reference to FIG. 5, an embodiment of an SCP subsystem 500 is illustrated that may provide the SCP subsystem 304 discussed above with reference to FIGS. 3, 4A, and 4B. As such, the SCP subsystem 500 may be provided by the IHS 100 discussed above with reference to FIG. 1 and/or may include some or all of the components of the IHS 100, and in specific examples may be provided as an SCP card, may be integrated into a motherboard, or may be provided as a separate/co-motherboard circuit board. However, while illustrated and discussed as being provided in different manners in a computing system 300/400, one of skill in the art in possession of the present disclosure will recognize that the functionality of the SCP subsystem 500 discussed below may be provided by other devices that are configured to operate similarly as the SCP subsystem 500 discussed below (e.g., other networking subsystems such as the SmartNIC device or the NIC device discussed above, etc.).

In the illustrated embodiment, the SCP subsystem 500 includes a chassis 502 (e.g., a circuit board) that supports the components of the SCP subsystem 500, only some of which are illustrated below. For example, the chassis 502 may support a networking processing subsystem (e.g., an SCP processing subsystem) including one or more networking/SCP processors (not illustrated, but which may include the processor 102 discussed above with reference to FIG. 1), and a networking memory subsystem (e.g., an SCP memory subsystem) (not illustrated, but which may include the memory 114 discussed above with reference to FIG. 1) that is coupled to the networking processing system and that includes instructions that, when executed by the networking processing system, cause the networking processing system to provide an expanded availability computing system engine 504 that is configured to perform the functionality of the expanded availability computing system engines and/or SCP subsystems discussed below.

The chassis 502 may also include a storage system (not illustrated, but which may include the storage 108 discussed above with reference to FIG. 1, the networking memory system discussed above, etc.) that is coupled to the expanded availability computing system engine 504 (e.g., via a coupling between the storage system and the networking/SCP processing subsystem) and that may include one or more expanded availability computing system databases 506 that are configured to store any of the information utilized by the expanded availability computing system engine 504 discussed below. The chassis 502 may also support a communication system 508 that is coupled to the expanded availability computing system engine 504 (e.g., via a coupling between the communication system 508 and the networking/SCP processing subsystem) and that may include the Network Interface Controller (NIC) device 508a illustrated in FIG. 5 that connects the SCP subsystem 304/500 to the network 204, the component connections 508 illustrated in FIG. 5 that connect the SCP subsystem 304/500 to components in the computing system 300/400, wireless communication systems (e.g., BLUETOOTH®, Near Field Communication (NFC) components, WiFi components, etc.), and/or any other communication components that would be apparent to one of skill in the art in possession of the present disclosure.

As such, the communication system 508 may include any of the connections discussed below between the SCP subsystem 500 and the network 204, the central processing subsystem 308, the BMC subsystem 310, the I/O device(s) 312, the other devices 316, and/or any other components utilized with the computing system 202a/300/400. However, while a specific SCP subsystem 500 has been illustrated and described, one of skill in the art in possession of the present disclosure will recognize that SCP subsystems (or other networking subsystems operating according to the teachings of the present disclosure in a manner similar to that described below for the SCP subsystem 500) may include a variety of components and/or component configurations for providing the functionality discussed below while remaining within the scope of the present disclosure as well.

Figure 6:
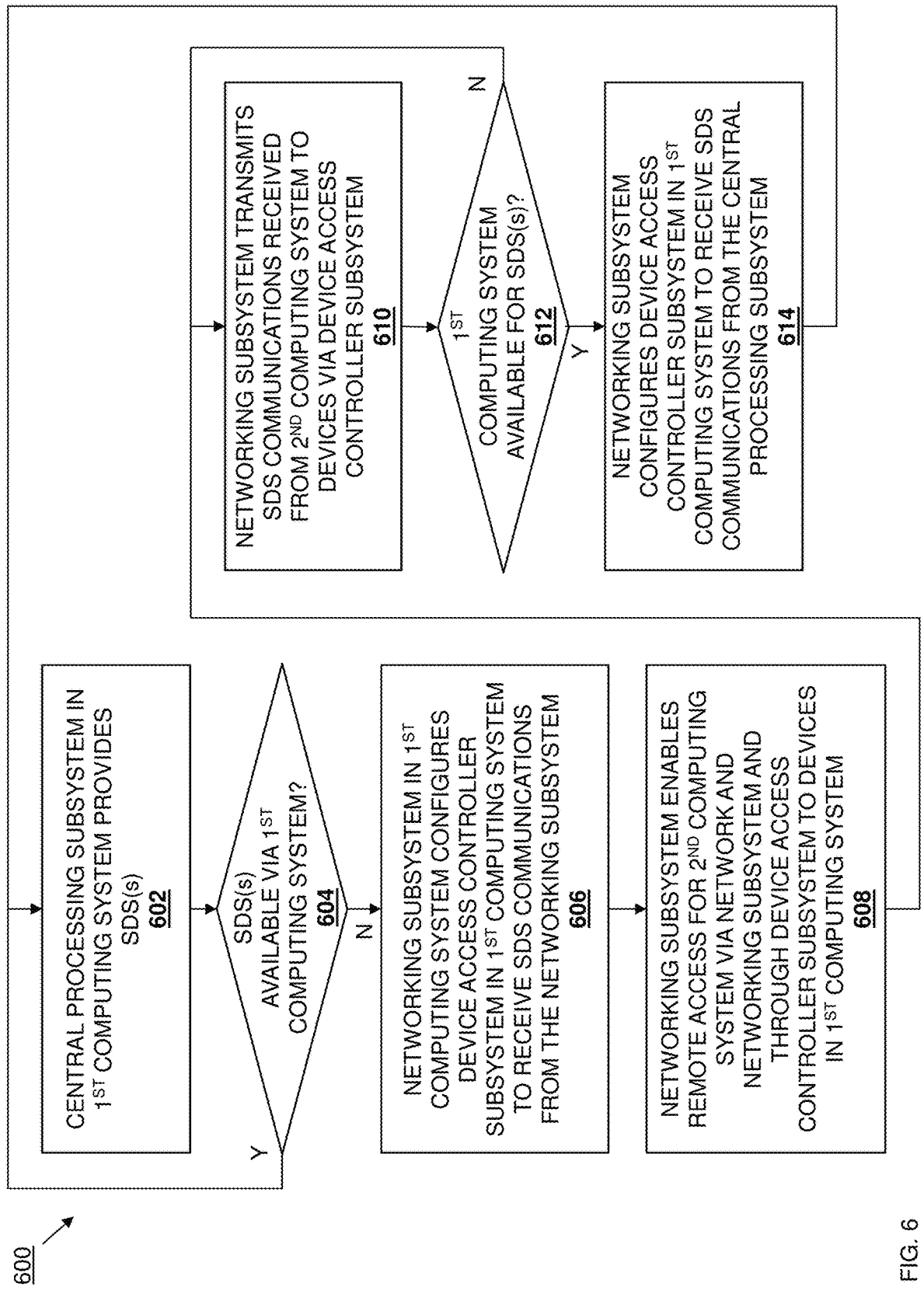
FIG. 6 is a flow chart illustrating an embodiment of a method for providing an expanded availability computing system.

Referring now to FIG. 6, an embodiment of a method 600 for providing an expanded availability computing system is illustrated. As discussed below, the systems and methods of the present disclosure provide a networking subsystem in a first computing system that is configured to enable a path for a second computing system to devices in the first computing system that are utilized to provide SDSs, which allows the second computing system to provide the SDSs using the devices in the first computing system that were previously used by the first computing system to provide the SDSs, and eliminates the need to backup data associated with those SDSs and/or the rebuilding of that data on the second computing system. For example, the expanded availability computing system of the present disclosure may include a first and second computing systems coupled together via a network. The first computing system includes a device access controller subsystem coupled to devices and a central processing subsystem that is configured to provide SDS(s) using the devices via the device access controller subsystem. A networking subsystem coupled to the device access controller subsystem determines that the at least one SDS is unavailable, configures the device access controller subsystem to receive SDS communications from the networking subsystem, enables remote access for the second computing system via the networking subsystem and through device access controller subsystem to the devices, and transmits SDS communications received from the second computing system to the devices via the device access controller subsystem so that the second computing device may provide the SDS(s) using the devices via the device access controller subsystem.

As such, the first computing system is provided with expanded availability that enables use of its devices to provide the SDS(s) even when the first computing system is unable to provide those SDS(s). Furthermore, the systems and methods of the present disclosure do not require the second computing system to have the same device(s) as the first computing system in order to backup SDS(s) being provided by the first computing system. For example, the second computing system may not include expensive I/O devices like GPUs, and may instead utilize a GPU in the first computing system to backup the SDSs as discussed above, thus enabling network configurations in which a single backup system without expensive I/O devices is provided to back up multiple different primary systems with different sets of relatively expensive I/O devices.

Figure 7A:
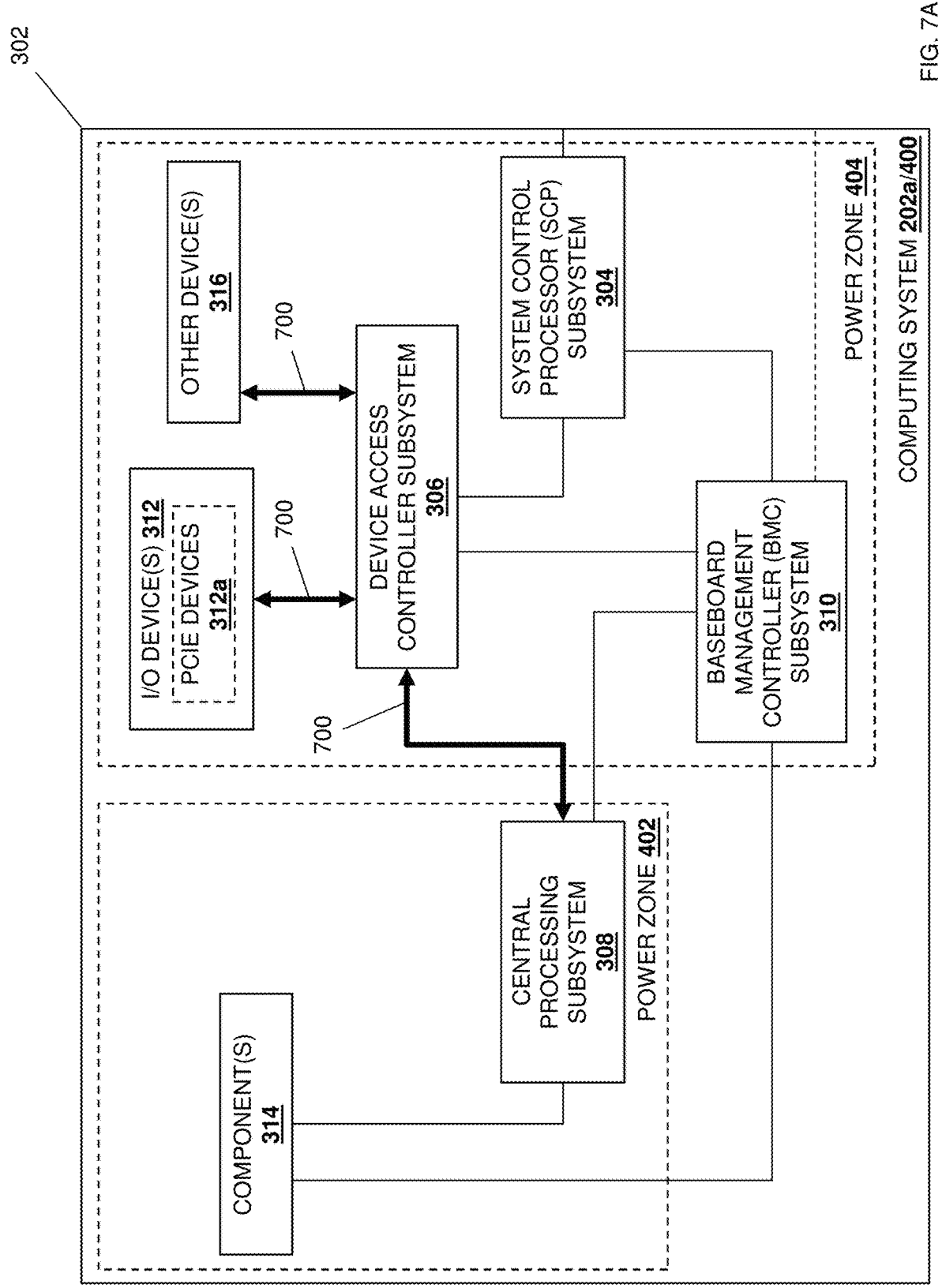
FIG. 7A is a schematic view illustrating an embodiment of the computing system of FIGS. 4A and 4B operating during the method of FIG. 6.

The method 600 begins at block 602 where a central processing subsystem in a first computing system provides one or more Software Defined Services (SDSs). With reference to FIG. 7A, in an embodiment of block 602, the central processing subsystem 308 in the computing system 202a/400 may operate to perform SDS provisioning operations 700 that may include exchanging SDS communications via the device access controller subsystem 306 with the I/O device(s) 312, PCIe device(s) 312a, and/or other device(s) 316 included in the computing system 202a/400, as well as performing any other operations that one of skill in the art in possession of the present disclosure would recognize as providing one or more SDSs. However, while the computing system 202a/400 is discussed in the example below as providing the SDS(s) for which the high availability functionality is utilized, one of skill in the art in possession of the present disclosure will recognize that any of the computing systems 202b and up to 202c and/or 300 may provide the SDS(s) for which the high availability functionality is utilized while remaining within the scope of the present disclosure as well.

As will be appreciated by one of skill in the art in possession of the present disclosure, the device access controller subsystem 306 may be provided by a fabric switch device that is configured to receive SDS communications from the central processing subsystem 308, and route those SDS communications to the I/O device(s) 312, PCIe device(s) 312a, and/or other device(s) 316 to which they are directed using a variety of switching techniques known in the art. Similarly, the device access controller subsystem 306 provided by the fabric switch device may be configured to receive SDS communications from the I/O device(s) 312, PCIe device(s) 312a, and/or other device(s) 316, and route those SDS communications to the central processing subsystem 308 using a variety of switching techniques known in the art. However, while described as a fabric switch device, one of skill in the art in possession of the present disclosure will appreciate that other embodiments of the device access controller subsystem 306 may utilize other techniques (e.g., controller techniques, translator board techniques, etc.) to enable the exchange of SDS communications discussed herein while remaining within the scope of the present disclosure as well.

Thus, at block 602, the central processing subsystem 308 may operate to provide one or more SDSs using the I/O device(s) 312, PCIe device(s) 312a, and/or other device(s) 316, which one of skill in the art in possession of the present disclosure will recognize may include software defined storage services, software defined processing services, and/or any other SDSs known the art. Furthermore, while described as providing SDSs, one of skill in the art in possession of the present disclosure will recognize that the SDSs discussed herein may be replaced by a variety of applications that utilize devices in a computing system to provide, for example, database services, data analytics, AI training, interference services, and/or any of a variety of other functionality known in the art. As will be appreciated by one of skill in the art in possession of the present disclosure, the provisioning of SDSs by the central processing subsystem 308 using the I/O device(s) 312, PCIe device(s) 312a, and/or other device(s) 316 may include the generation and storage of "content" data (e.g., content data generated and stored on NVMe storage devices, SAS storage devices, and/or other storage device that may be provided by the PCIe devices 312a/I/O devices 312), the generation and storage of "state" data (e.g., state data generated and stored on the I/O device(s) 312, PCIe device(s) 312a, and/or other device(s) 316 such as GPUs), and/or the generation and storage of any other data that would be apparent to one of skill in the art in possession of the present disclosure. As such, the provisioning of the one or more SDSs using the I/O device(s) 312, PCIe device(s) 312a, and/or other device(s) 316 may operate to configure those devices (e.g., via the data generated and stored on and/or in association with those devices) to allow the one or more SDS(s) to be provided in the manner in which they are provided at any particular point in time.

The method 600 then proceeds to decision block 604 where it is determined whether the SDS(s) are available via the first computing system. In different embodiments, at decision block 604, different devices may operate at decision block 604 to directly determine whether the SDS(s) are available via the computing device 202a/400, and any of those direct SDS availability determinations may result in the SCP subsystem 304 in the computing system 202a/400 determining whether the SDS(s) are available via the computing device 202a/400 at block 604 as well. In one embodiment, at decision block 604, the expanded availability computing system engine 504 in the SCP subsystem 304/500 in the computing system 202a/400 may operate to directly determine whether the SDS(s) are available via the computing system 202a/400 based on communications with the central processing subsystem 308 in the computing system 202a/400 that is providing those SDS(s). For example, the expanded availability computing system engine 504 in the SCP subsystem 304/500 in the computing system 202a/400 may exchange communications (e.g., "alive-test" communications) with the central processing subsystem 308 in the computing system 202a/400 that is providing those SDS(s) via the device access controller subsystem 306, and at decision block 604 may determine whether the central processing subsystem 308 has not responded to those communications for some time period, has not transmitted those communications for some time period, and/or has otherwise indicated that the SDS(s) are no longer available via the computing system 202a/400.

In another embodiment, at decision block 604, the BMC subsystem 310 in the computing system 202a/400 may operate to directly determine whether the SDS(s) are available via the computing system 202a/400 based on communications with the central processing subsystem 308 in the computing system 202a/400 that is providing those SDS(s). For example, the BMC subsystem 310 in the computing system 202a/400 may exchange communications (e.g., "alive-test" communications) with the central processing subsystem 308 in the computing system 202a/400 that is providing those SDS(s), and at decision block 604 may determine whether the central processing subsystem 308 has not responded to "alive-test" communications for some time period, has not transmitted "alive-test" communications for some time period, and/or has otherwise indicated that the SDS(s) are no longer available via the computing system 202a/400. As will be appreciated by one of skill in the art in possession of the present disclosure, any direct determination of whether the SDS(s) are available via the computing system 202a/400 may be communicated by the BMC subsystem 310 to the SCP subsystem 304 in the computing system 202a/400 in a variety of manners such that the SCP subsystem 304 indirectly determines whether the SDS(s) are available via the computing system 202a/400.

In another embodiment, at decision block 604, the management system 206 may operate to directly determine whether the SDS(s) are available via the computing system 202a/400 based on communications with the central processing subsystem 308 in the computing system 202a/400 that is providing those SDS(s). For example, the management system 206 may exchange communications (e.g., "alive-test" communications) with the central processing subsystem 308 in the computing system 202a/400 that is providing those SDS(s) (e.g., via the SCP subsystem 304 and device access controller subsystem 306 in the computing system 202a/400, or via the SCP subsystem 304 and the BMC subsystem 310 in the computing system 202a/400), and at decision block 604 may determine whether the central processing subsystem 308 has not responded to "alive-test" communications for some time period, has not transmitted "alive-test" communications for some time period, and/or has otherwise indicated that the SDS(s) are no longer available via the computing system 202a/400. As will be appreciated by one of skill in the art in possession of the present disclosure, any direct determination of whether the SDS(s) are available via the computing system 202a/400 may be communicated by the management system 206 to the SCP subsystem 304 in the computing system 202a/400 in a variety of manners (e.g., via the network 204) such that the SCP subsystem 304 indirectly determines whether the SDS(s) are available via the computing system 202a/400.

In another embodiment, at decision block 604, a remote host that is provided by the computing system 202b in the examples below may operate to directly determine whether the SDS(s) are available via the computing system 202a/400 based on communications with the central processing subsystem 308 in the computing system 202a/400 that is providing those SDS(s). For example, the computing system 202b may exchange communications (e.g., "alive-test" communications) with the central processing subsystem 308 in the computing system 202a/400 that is providing those SDS(s) (e.g., via the SCP subsystem 304 and device access controller subsystem 306 in the computing system 202a/400, or via the SCP subsystem 304 and the BMC subsystem 310 in the computing system 202a/400), and at decision block 604 may determine whether the central processing subsystem 308 has not responded to "alive-test" communications for some time period, has not transmitted "alive-test" communications for some time period, and/or has otherwise indicated that the SDS(s) are no longer available via the computing system 202a/400. As will be appreciated by one of skill in the art in possession of the present disclosure, any direct determination of whether the SDS(s) are available via the computing system 202a/400 may be communicated by the computing system 202b to the SCP subsystem 304 in the computing system 202a/400 in a variety of manners (e.g., via the network 204) such that the SCP subsystem 304 indirectly determines whether the SDS(s) are available via the computing system 202a/400.

If, at decision block 604, it is determined that the SDS(s) are available via the first computing system, the method 600 returns to block 602. As such, the method 600 may loop such that the central processing subsystem 308 in the computing system 202a/400 operates to provide the SDS(s) as along as it is capable of doing so. If, at decision block 604, it is determined that the SDS(s) are not available via the first computing system, the method 600 proceeds to block 606 where a networking subsystem in the first computing system configures a device access controller subsystem in the first computing system to receive SDS communications from the networking subsystem. As will be appreciated by one of skill in the art in possession of the present disclosure, the SDS(s) being provided by the central processing subsystem 308 in the computing system 202a/400 may become unavailable for a wide variety of reasons that will fall within the scope of the present disclosure. For example, the SDS(s) being provided by the central processing subsystem 308 in the computing system 202a/400 may become unavailable due to a central processing subsystem failure that makes the central processing subsystem 308 unavailable, a computing system reboot that makes the central processing subsystem 308 unavailable while reboot operations are performed (reboot operations that may be performed in an attempt to remedy a software issue associated with the SDS(s)), a failure or unavailability of the power zone 402 that makes the central processing subsystem 308 unavailable, and/or any other SDS unavailability situation that would be apparent to one of skill in the art in possession of the present disclosure.

Figure 7B:
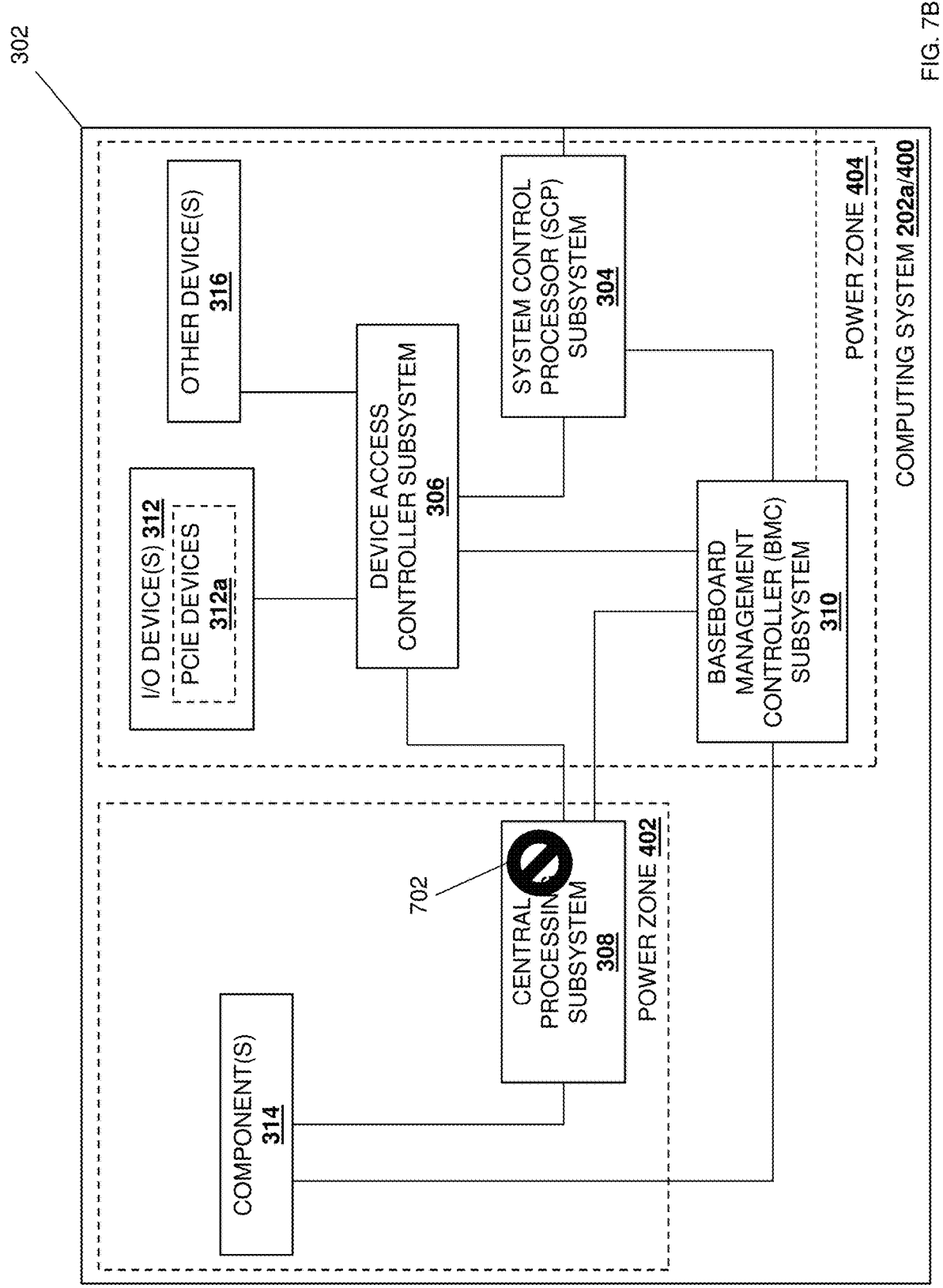
FIG. 7B is a schematic view illustrating an embodiment of the computing system of FIGS. 4A and 4B operating during the method of FIG. 6.
Figure 8A:
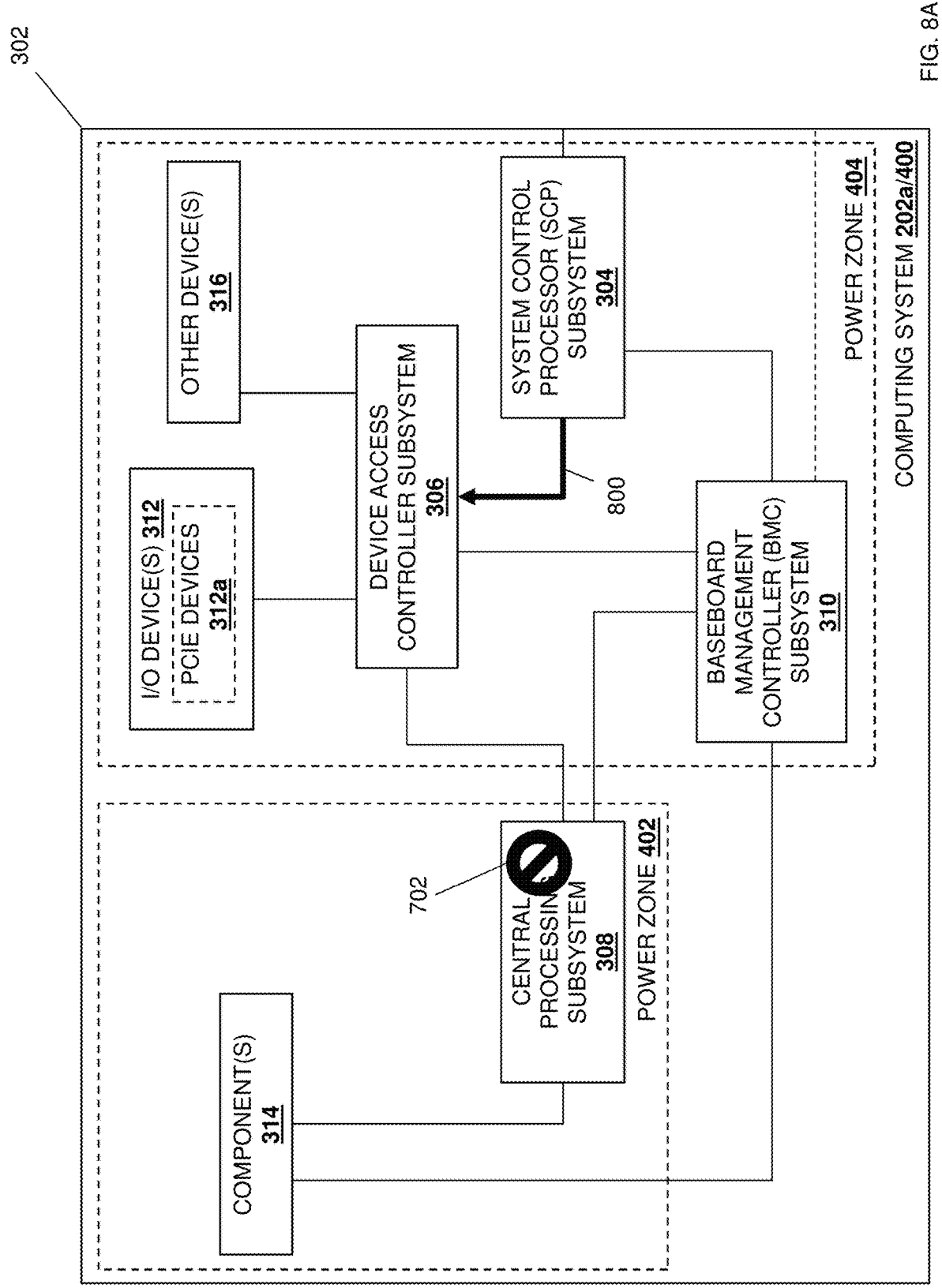
FIG. 8A is a schematic view illustrating an embodiment of the computing system of FIGS. 4A and 4B operating during the method of FIG. 6.

As such, with reference to FIG. 7B, in some embodiments of decision block 604 the central processing subsystem 308 may become unavailable (as indicated by element 702 in the FIG. 7B) such that the SDS(s) are not available via the computing system 202a/400, and that SDS unavailability will cause the method 600 to proceed to block 606. In an embodiment, at block 606, the SCP subsystem 304/500 in the computing system 202a/400 may operate to directly or indirectly configure the device access controller subsystem 306 in the computing system 202a/400 to receive SDS communications from the SCP subsystem 304/500 in the computing system 202a/400. For example, with reference to FIG. 8A, the expanded available computing system engine 504 in the SCP subsystem 304/500 may perform device access controller subsystem configuration operations 800 to directly configure the device access controller subsystem 306 in the computing system 202a/400 by, for example, generating and transmitting device access controller subsystem reconfiguration instructions via the component connections 508b in the communication system 508 and to the device access controller subsystem 306.

Figure 8B:
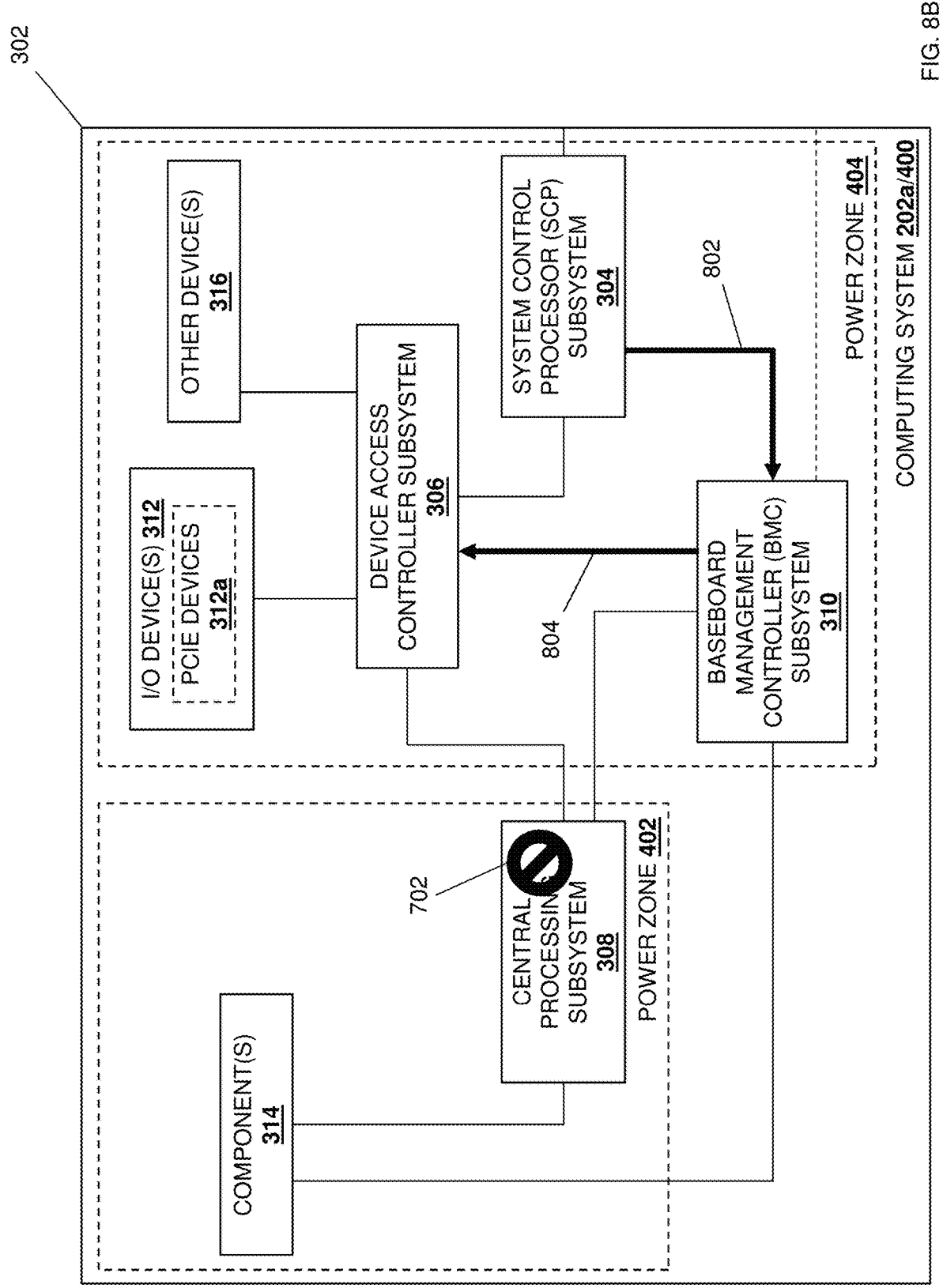
FIG. 8B is a schematic view illustrating an embodiment of the computing system of FIGS. 4A and 4B operating during the method of FIG. 6.

In another example, with reference to FIG. 8B, at block 606 the expanded available computing system engine 504 in the SCP subsystem 304/500 may perform device access controller subsystem configuration operations 802 to indirectly configure the device access controller subsystem 306 in the computing system 202a/400 by, for example, generating and transmitting device access controller subsystem reconfiguration instructions via the component connections 508b in the communication system 508 and to the BMC subsystem 310 in the computing system 202a/400, which causes the BMC subsystem 310 to perform device access controller subsystem configuration operations 804 to configure the device access controller subsystem 306 accordingly.

Figure 8C:
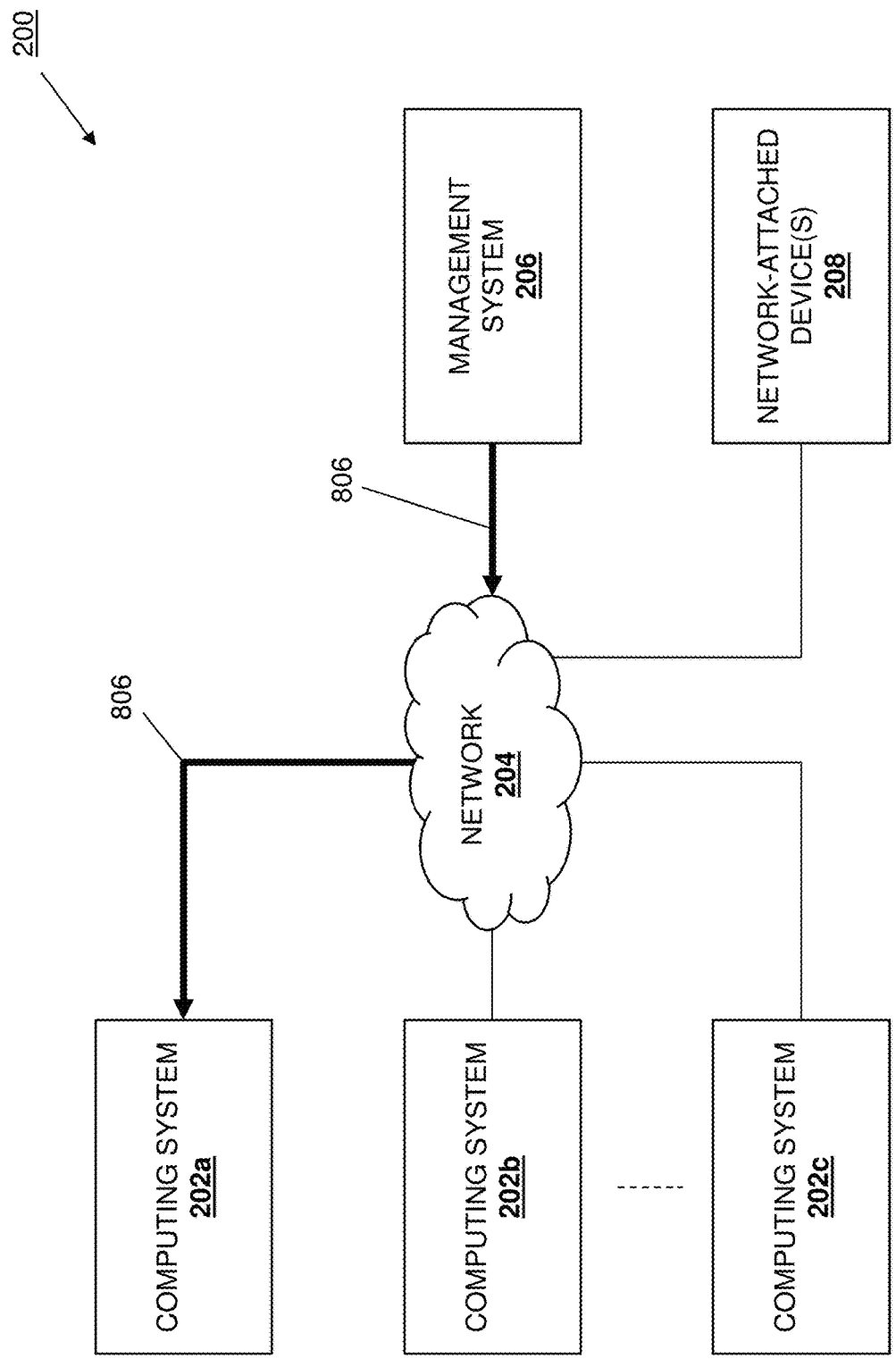
FIG. 8C is a schematic view illustrating an embodiment of the networked system of FIG. 2 operating during the method of FIG. 6.
Figure 8D:
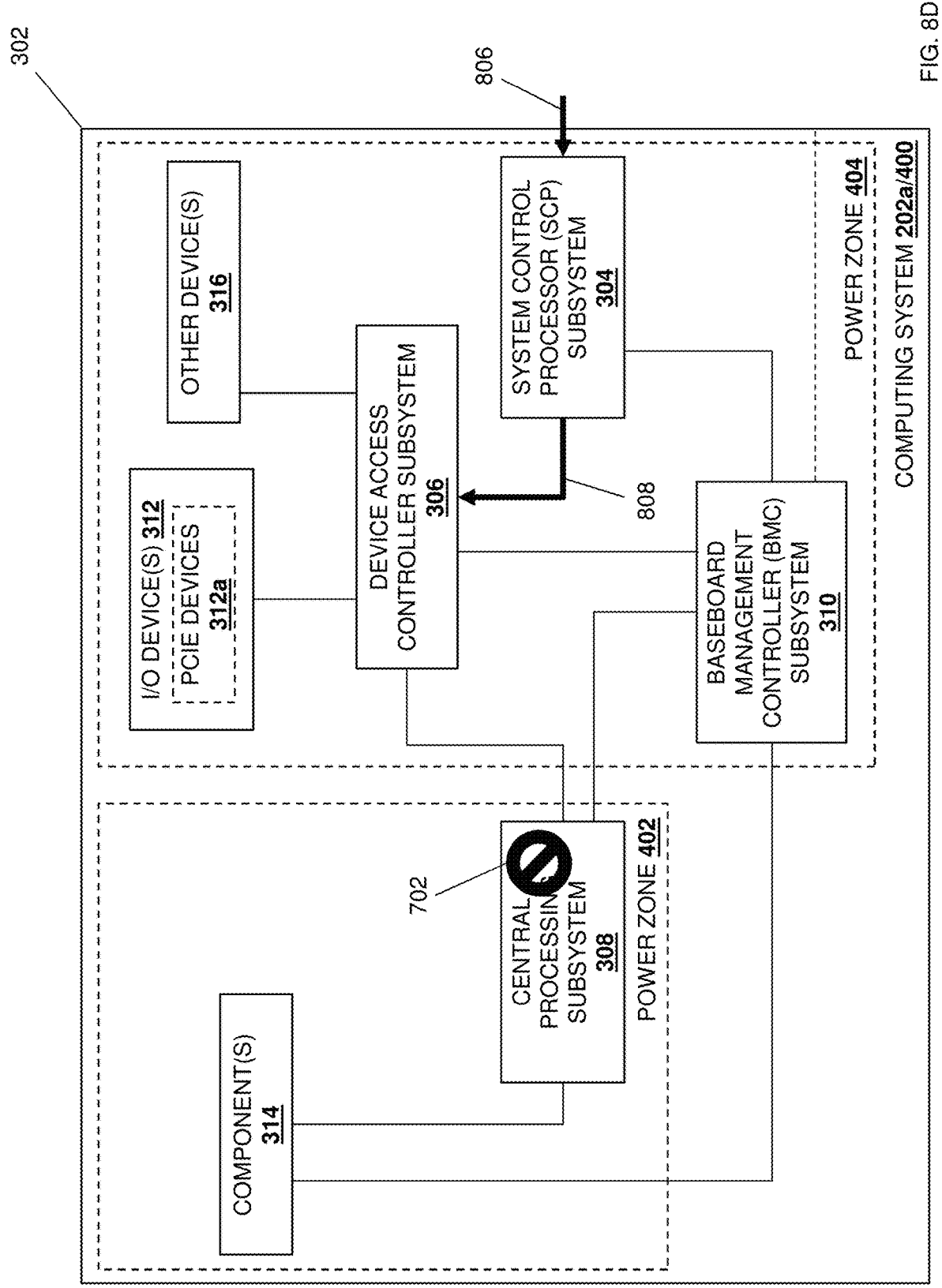
FIG. 8D is a schematic view illustrating an embodiment of the computing system of FIGS. 4A and 4B operating during the method of FIG. 6.

In another example, with reference to FIGS. 8C and 8D, at block 606 the management system 206 may perform device access controller subsystem configuration operations 806 to configure the device access controller subsystem 306 in the computing system 202a/400 by, for example, generating and transmitting device access controller subsystem configuration instructions via the network 204 and to the SCP subsystem 304/500 in the computing system 202a/400, which causes the SCP subsystem 304/500 to perform device access controller subsystem configuration operations 808 to indirectly configure the device access controller subsystem 306 accordingly (e.g., by forwarding those device access controller subsystem configuration instructions received from the management system 206 to the device access controller subsystem 306).

Figure 8E:
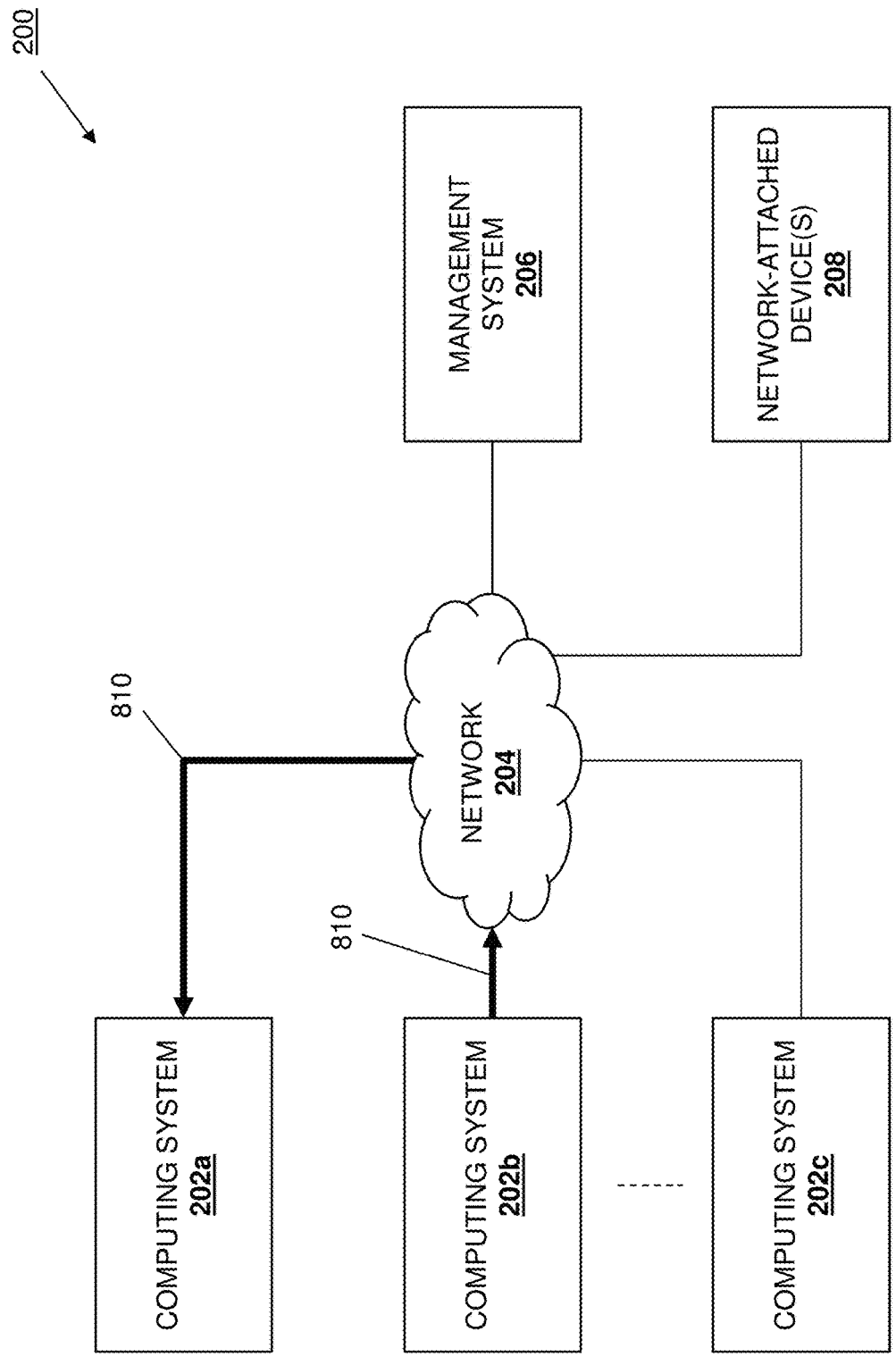
FIG. 8E is a schematic view illustrating an embodiment of the networked system of FIG. 2 operating during the method of FIG. 6.
Figure 8F:
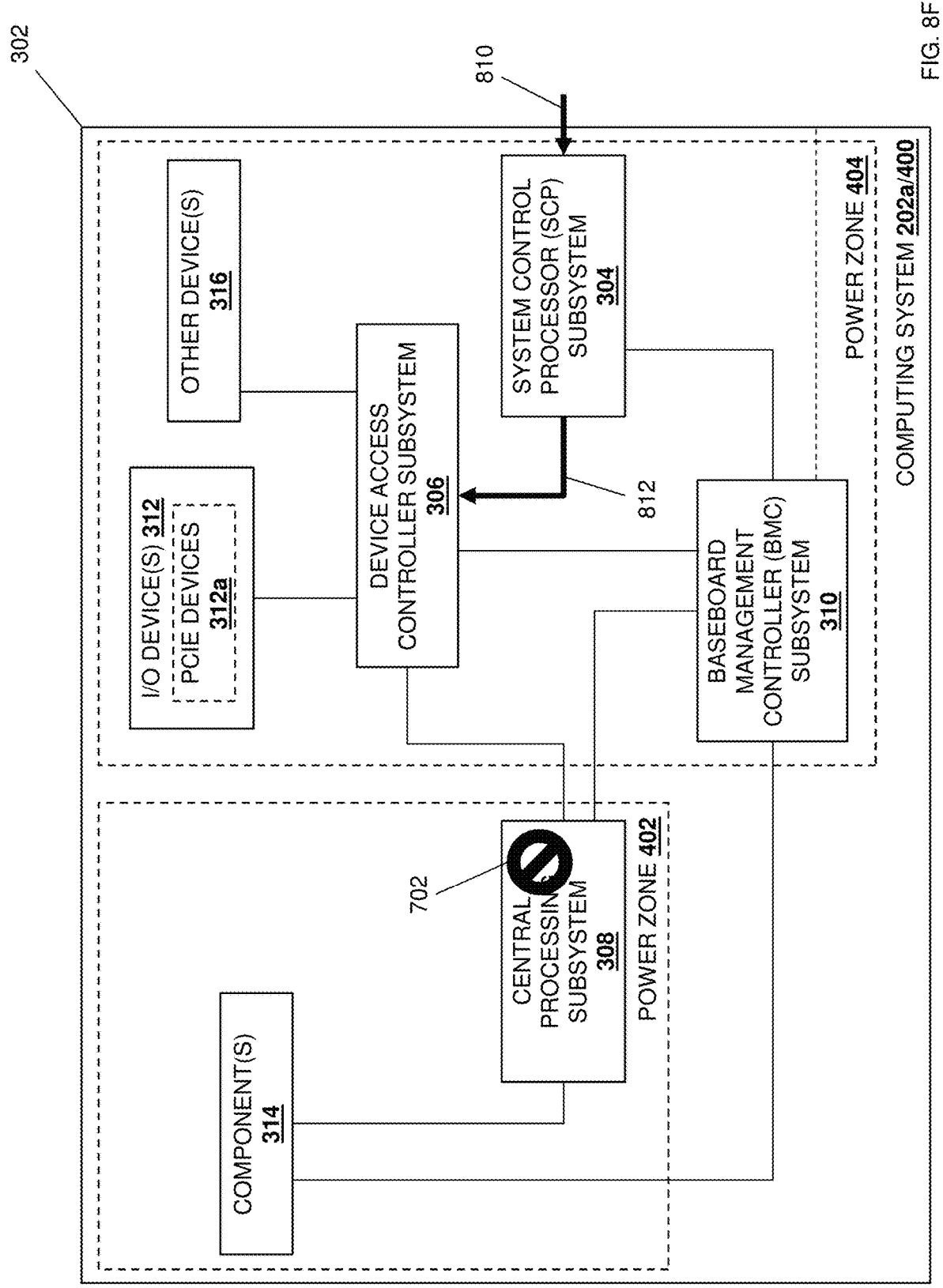
FIG. 8F is a schematic view illustrating an embodiment of the computing system of FIGS. 4A and 4B operating during the method of FIG. 6.

In another example, with reference to FIGS. 8E and 8F, at block 606 a remote host that is provided by the computing system 202b in the examples below may operate to perform device access controller subsystem configuration operations 810 to configure the device access controller subsystem 306 in the computing system 202a/400 by, for example, generating and transmitting device access controller subsystem configuration instructions via the network 204 and to the SCP subsystem 304/500 in the computing system 202a/400, which causes the SCP subsystem 304/500 to perform device access controller subsystem configuration operations 812 to indirectly configure the device access controller subsystem 306 accordingly (e.g., by forwarding those device access controller subsystem configuration instructions received from the computing system 202b to the device access controller subsystem 306).

However, while several examples of the configuration of the device access controller subsystem 308 are described, one of skill in the art in possession of the present disclosure will appreciate that the device access controller subsystem of the present disclosure (e.g., a fabric switch device) may be configured in a variety of manners that will fall within the scope of the present disclosure as well. Furthermore, while a few specific techniques are described herein for configuring access to devices via the device access controller subsystem, some of the inventors of the present disclosure describe further techniques for configuring access to devices in a computing system that may be utilized along with the present disclosure in U.S. patent application Ser. No. 17/081,808, filed on Oct. 27, 2020, the disclosure of which is incorporate by reference herein in its entirety.

As will be appreciated by one of skill in the art in possession of the present disclosure, prior to block 606 the device access controller subsystem 308 may be configured to receive SDS communications from the central processing subsystem 308 and transmit those SDS communications to the I/O device(s) 312, PCIe device(s) 312a, and/or other device(s) 316 to provide the SDS(s) as discussed above with reference to block 602. For example, a fabric switch device that provides the device access controller subsystem 308 in the computing system 202a/400 may be configured to receive SDS communications from the central processing subsystem 308 and transmit those SDS communications to the I/O device(s) 312, PCIe device(s) 312a, and/or other device(s) 316 via the fabric.

Furthermore, one of skill in the art in possession of the present disclosure will recognize how, in some embodiments, the device access controller subsystem 308 may be reconfigured to receive SDS communications from the SCP subsystem 304/500 in the computing system 202a/400 and transmit those SDS communications to the I/O device(s) 312, PCIe device(s) 312a, and/or other device(s) 316 to provide the SDS(s) as discussed in further detail below with reference to block 610. For example, a fabric switch device that provides the device access controller subsystem 308 in the computing system 202a/400 may be reconfigured to receive SDS communications from the SCP subsystem 304/500 in the computing system 202a/400 and transmit those SDS communications to the I/O device(s) 312, PCIe device(s) 312a, and/or other device(s) 316 via the fabric. However, while a specific configuration/reconfiguration scenario is described, one of skill in the art in possession of the present disclosure will appreciate how the device access controller subsystem 308 may be configured to provide the functionality in a variety of manners that will fall within the scope of the present disclosure as well.

As will be appreciated by one of skill in the art in possession of the present disclosure, the I/O device(s) 312, PCIe device(s) 312a, and/or other device(s) 316 may not be configured and/or capable of presenting themselves as more than one device, which requires the reconfiguration of the device access controller subsystem 308 discussed above in order switch access to that device from the central processing subsystem 308 to the SCP subsystem 304/500 in order to enable the remote access to that device through the network 204 and via the SCP subsystem 204/500 as discussed in further detail below. However, in some embodiments, the I/O device(s) 312, PCIe device(s) 312a, and/or other device(s) 316 in the computing system 202a/400 may be configured to present themselves to both the SCP subsystem 304/500 and the central processing subsystem 308 simultaneously such that the reconfiguration of the device access controller subsystem 308 discussed above is not required.

For example, any of the I/O device(s) 312, PCIe device(s) 312a, and/or other device(s) 316 may be configured to natively support multiple device presentation (e.g., using PCIe I/O virtualization techniques) that eliminate the need to reconfigure the device access controller subsystem 308 following the determination that the SDS(s) are unavailable via the computing system 202a/400. In another example, any of the I/O device(s) 312, PCIe device(s) 312a, and/or other device(s) 316 may include multiple physical ports to support multiple device presentation that eliminate the need to reconfigure the device access controller subsystem 308 following the determination that the SDS(s) are unavailable via the computing system 202a/400. As such, the configuration of the device access controller subsystem 308 in the computing system 202a/400 to receive SDS communications from the SCP subsystem 304/500 at block 606 may be performed prior to determining that the SDS(s) are unavailable via the computing system 202a/400 (i.e., the device access controller subsystem 308 may be configured to receive SDS communications from the SCP subsystem 304/500 simply because the I/O device(s) 312, PCIe device(s) 312a, and/or other device(s) 316 are configured to natively support multiple device presentation as discussed above).

The method 600 then proceeds to block 608 where the networking subsystem enables remote access for a second computing system via a network and the networking subsystem and through the device access controller subsystem to devices in the first computing system. In an embodiment, at block 608, the expanded availability computing system engine 504 in the SCP subsystem 304/500 may operate to enable remote access for the computing system 202b via the network 204 and the SCP subsystem 304/500 and through the device access controller subsystem 308 to the to the I/O device(s) 312, PCIe device(s) 312a, and/or other device(s) 316 in the computing system 202a/400. For example, at block 608, the expanded availability computing system engine 504 in the SCP subsystem 304/500 may configure the NIC device 508a in the communication system 508 in a manner that allows the computing system 202b remote access via the network 204 and the SCP subsystem 304/500 and through the device access controller subsystem 308 to the to the I/O device(s) 312, PCIe device(s) 312a, and/or other device(s) 316 in the computing system 202a/400.

For example, the configurations performed at block 608 may include an SCP subsystem 304/500 being configured to perform a remote access protocol (e.g., an NVMe over Fabric protocol) to transmit device traffic over the network 204 that would otherwise travel locally within its computing system, configuring an SCP subsystem to present the devices in its computing system to remote SCP subsystems, configuring an SCP subsystem to access remote devices, and/or other configuration operations that would be apparent to one of skill in the art in possession of the present disclosure. However, while particular operations have been described for enabling remote access for the computing system 202b to the I/O device(s) 312, PCIe device(s) 312a, and/or other device(s) 316 in the computing system 202a/400, one of skill in the art in possession of the present disclosure will appreciate that other operations may be performed to enable the remote access discussed below while remaining within the scope of the present disclosure as well.

The method 600 then proceeds to block 610 where the networking subsystem transmits SDS communications received from the second computing system to the devices via the device access controller subsystem. In an embodiment, at block 610, the computing system 202b may be configured to provide the SDS(s) that were previously being provided by the computing system 202a according to block 602. For example, at block 610, the SCP subsystem 304/500 and/or the management system 206 may use a variety of SDS configurations techniques known in the art operate to configure the computing system 202b to perform remote SDS provisioning operations using the I/O device(s) 312, PCIe device(s) 312a, and/or other device(s) 316 in the computing system 202a/400.

Figure 9A:
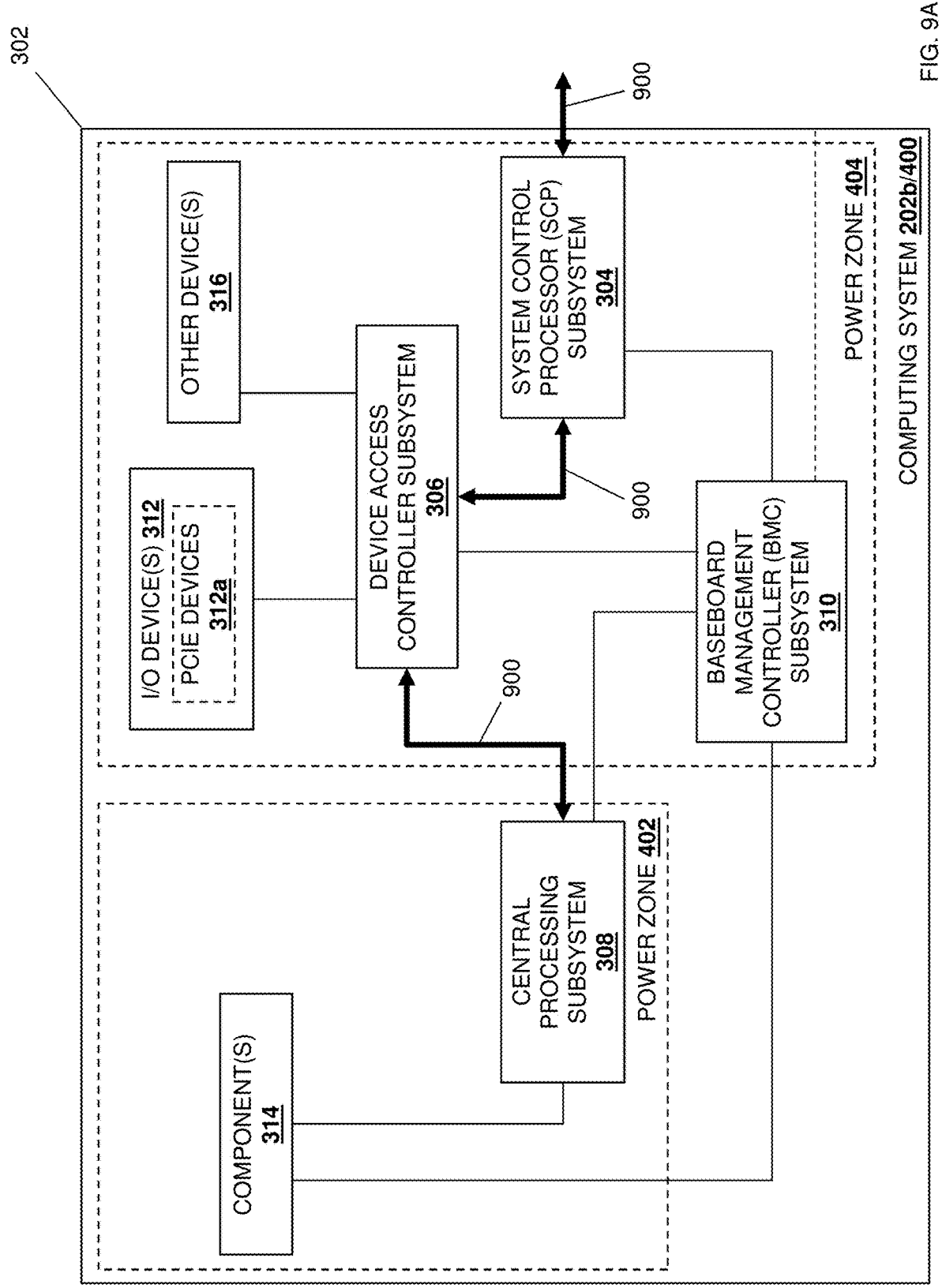
FIG. 9A is a schematic view illustrating an embodiment of the computing system of FIGS. 4A and 4B operating during the method of FIG. 6.
Figure 9B:
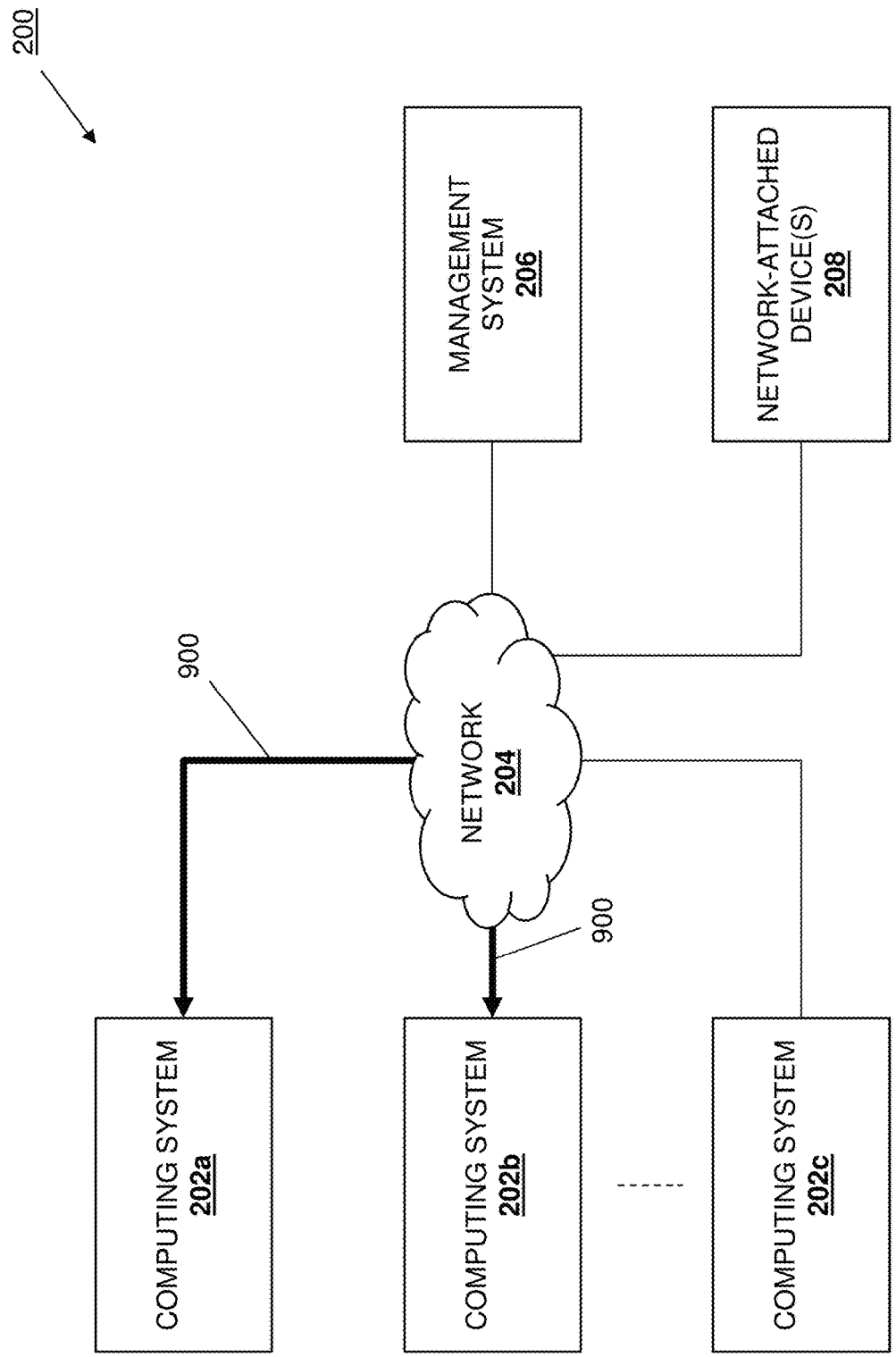
FIG. 9B is a schematic view illustrating an embodiment of the networked system of FIG. 2 operating during the method of FIG. 6.
Figure 10:
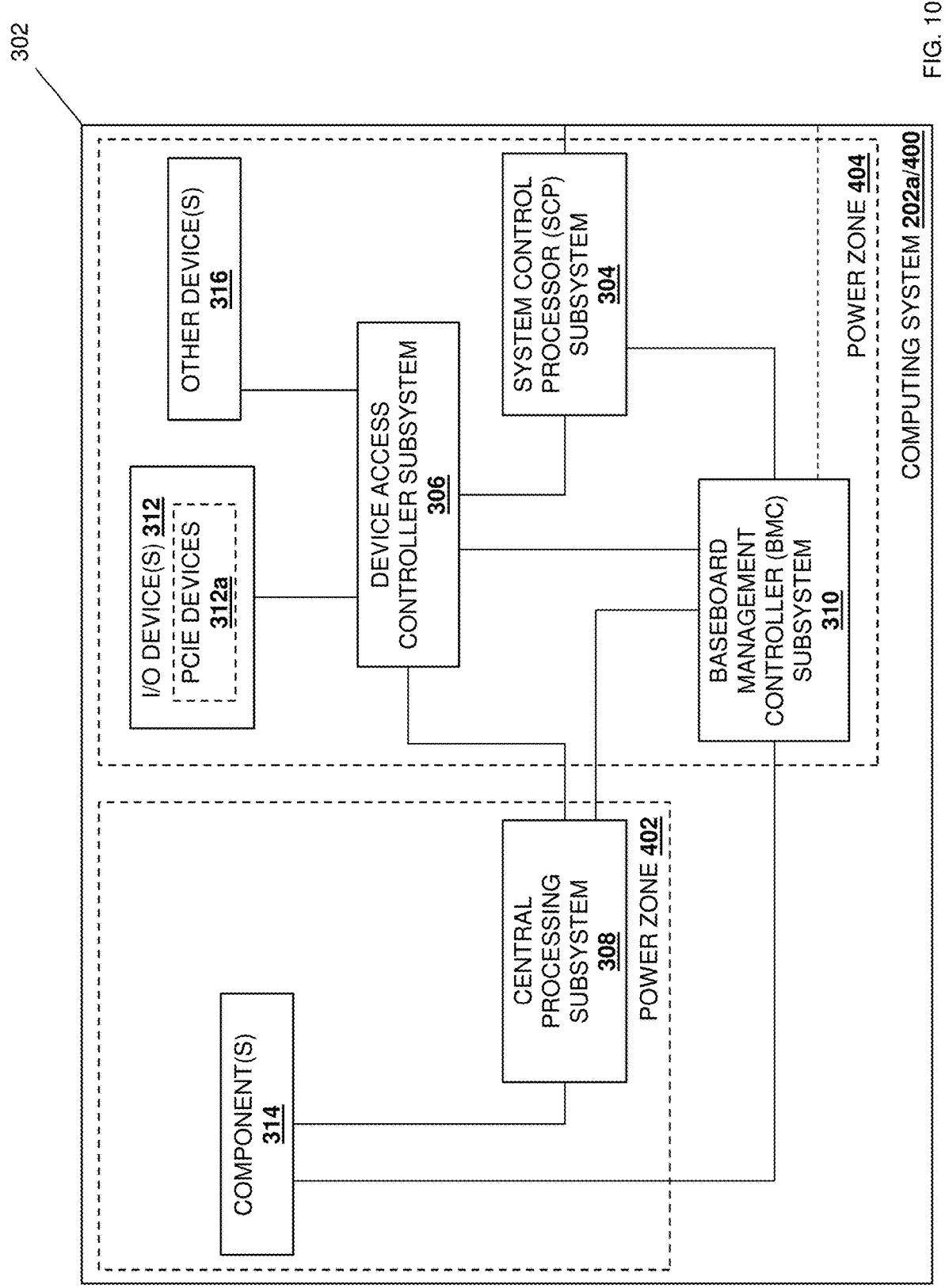
FIG. 10 is a schematic view illustrating an embodiment of the computing system of FIGS. 4A and 4B operating during the method of FIG. 6.
Figure 11A:
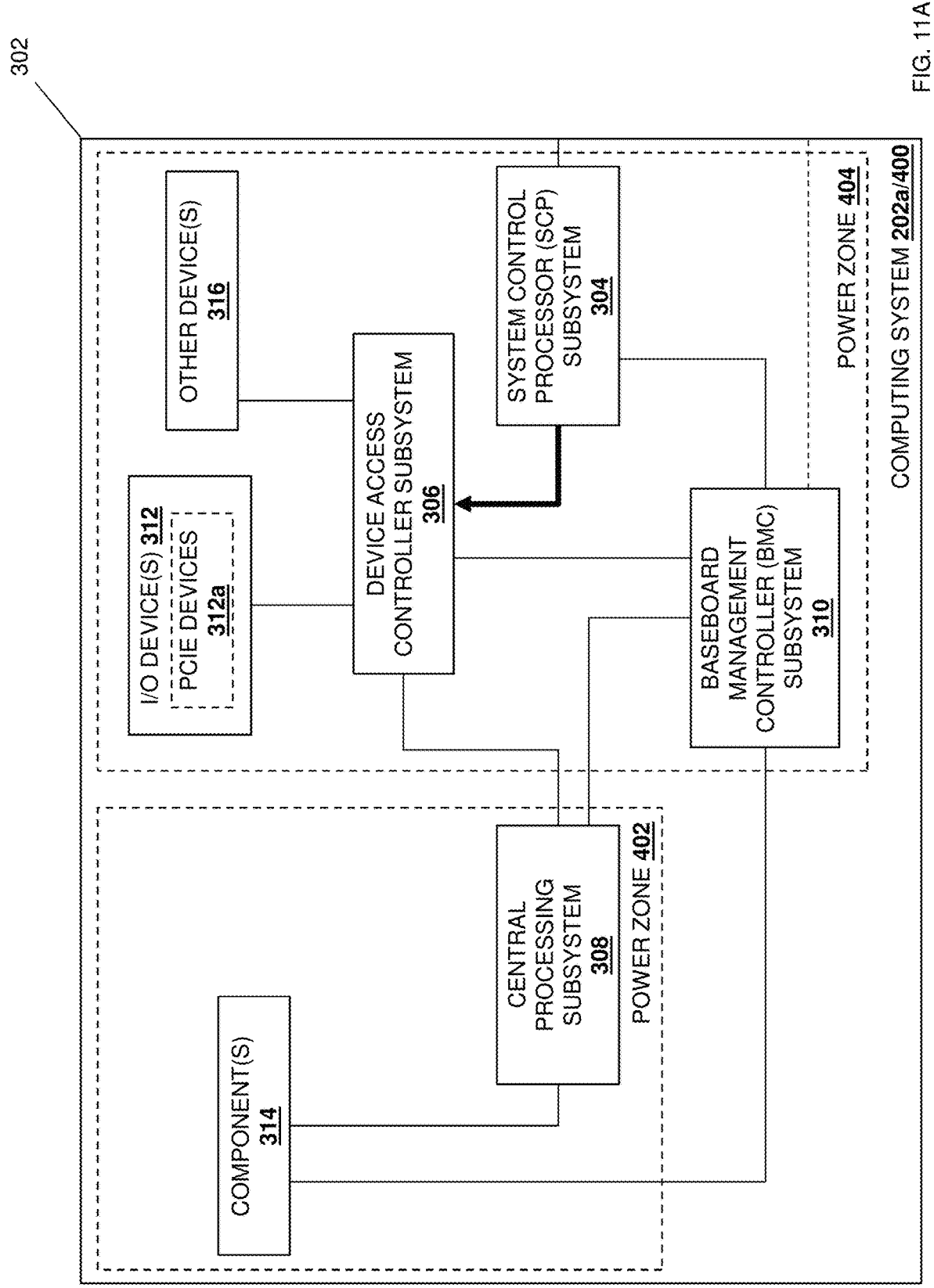
FIG. 11A is a schematic view illustrating an embodiment of the computing system of FIGS. 4A and 4B operating during the method of FIG. 6.
Figure 11B:
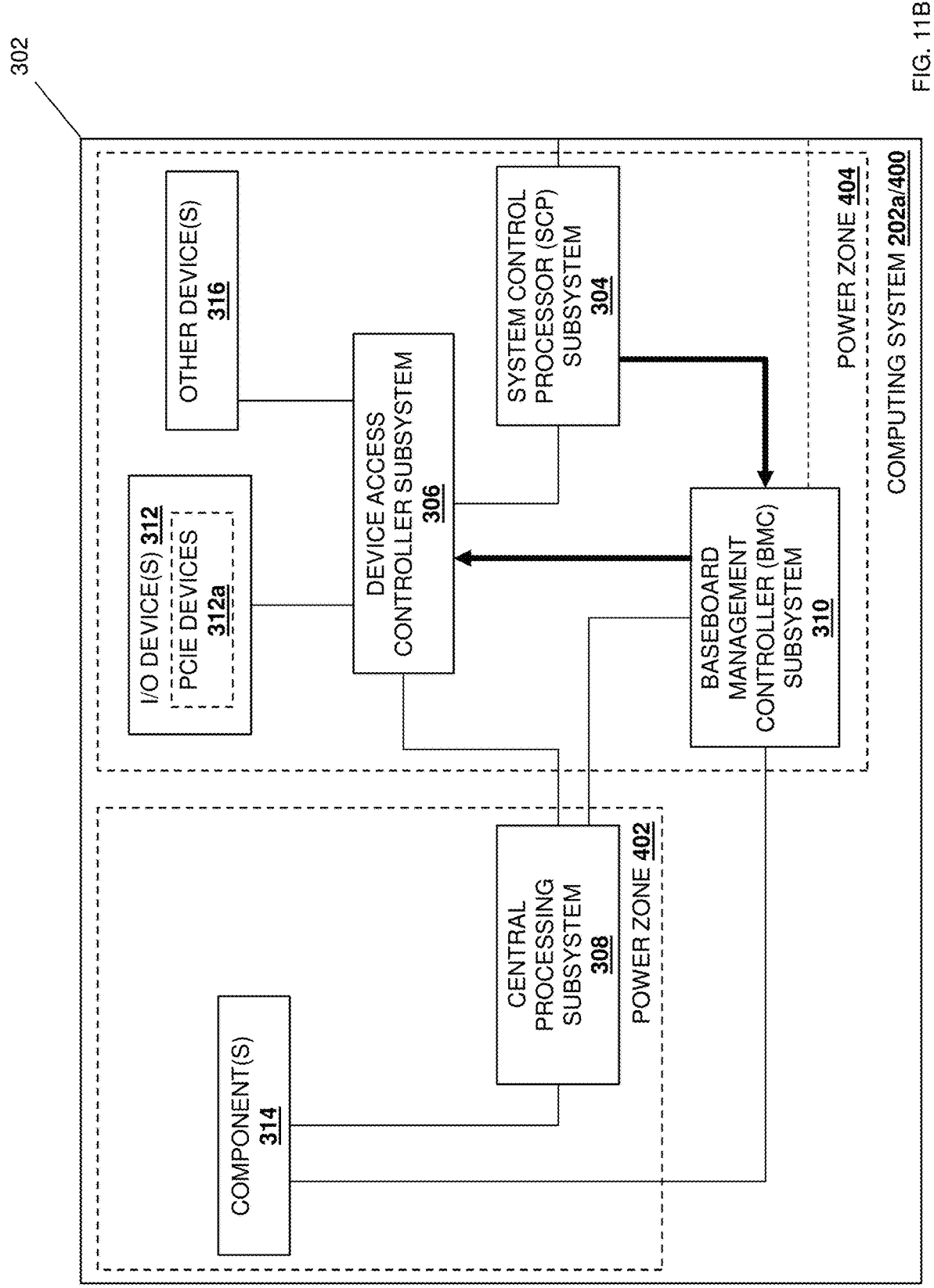
FIG. 11B is a schematic view illustrating an embodiment of the computing system of FIGS. 4A and 4B operating during the method of FIG. 6.
Figure 11C:
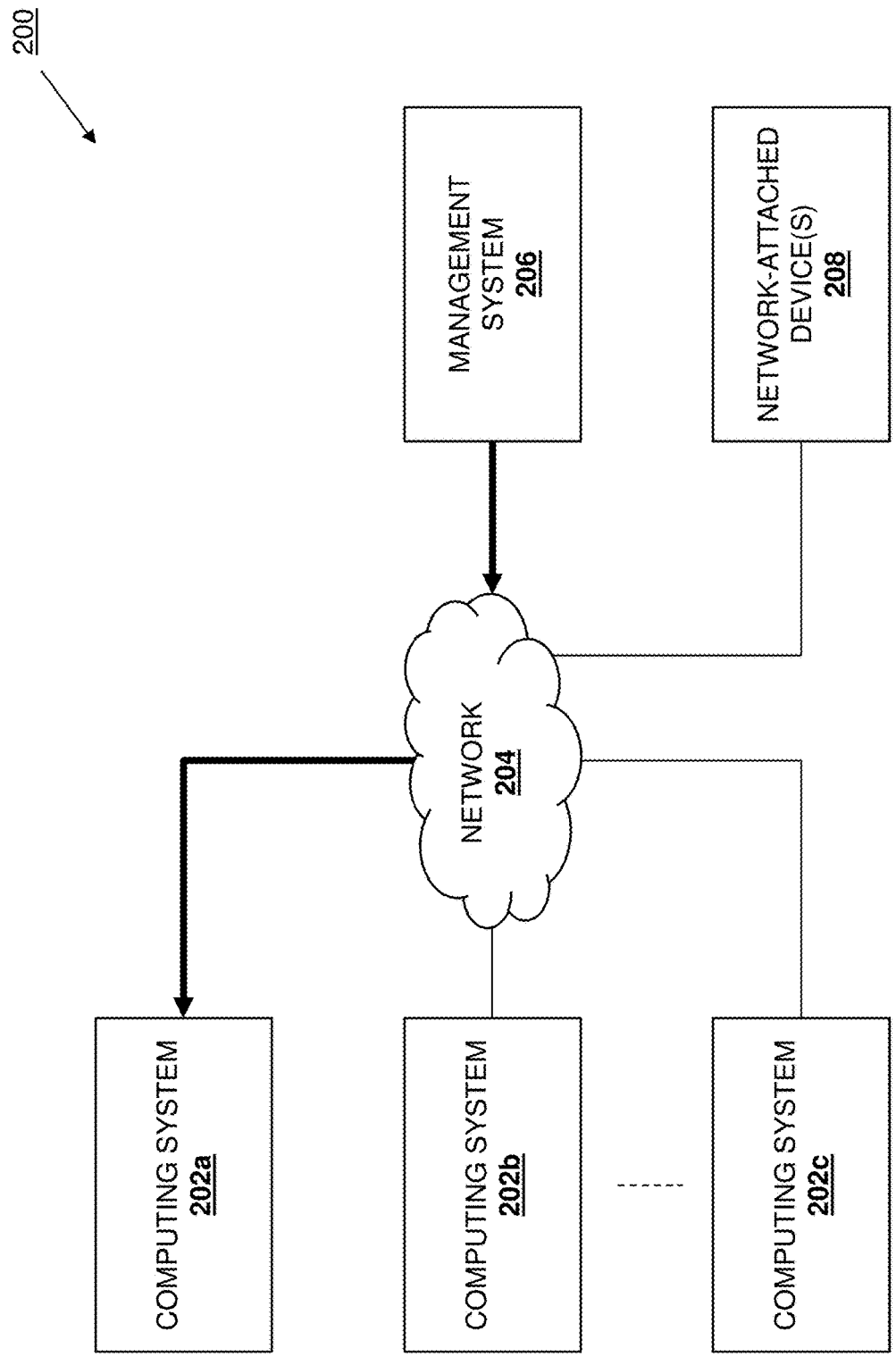
FIG. 11C is a schematic view illustrating an embodiment of the networked system of FIG. 2 operating during the method of FIG. 6.
Figure 11D:
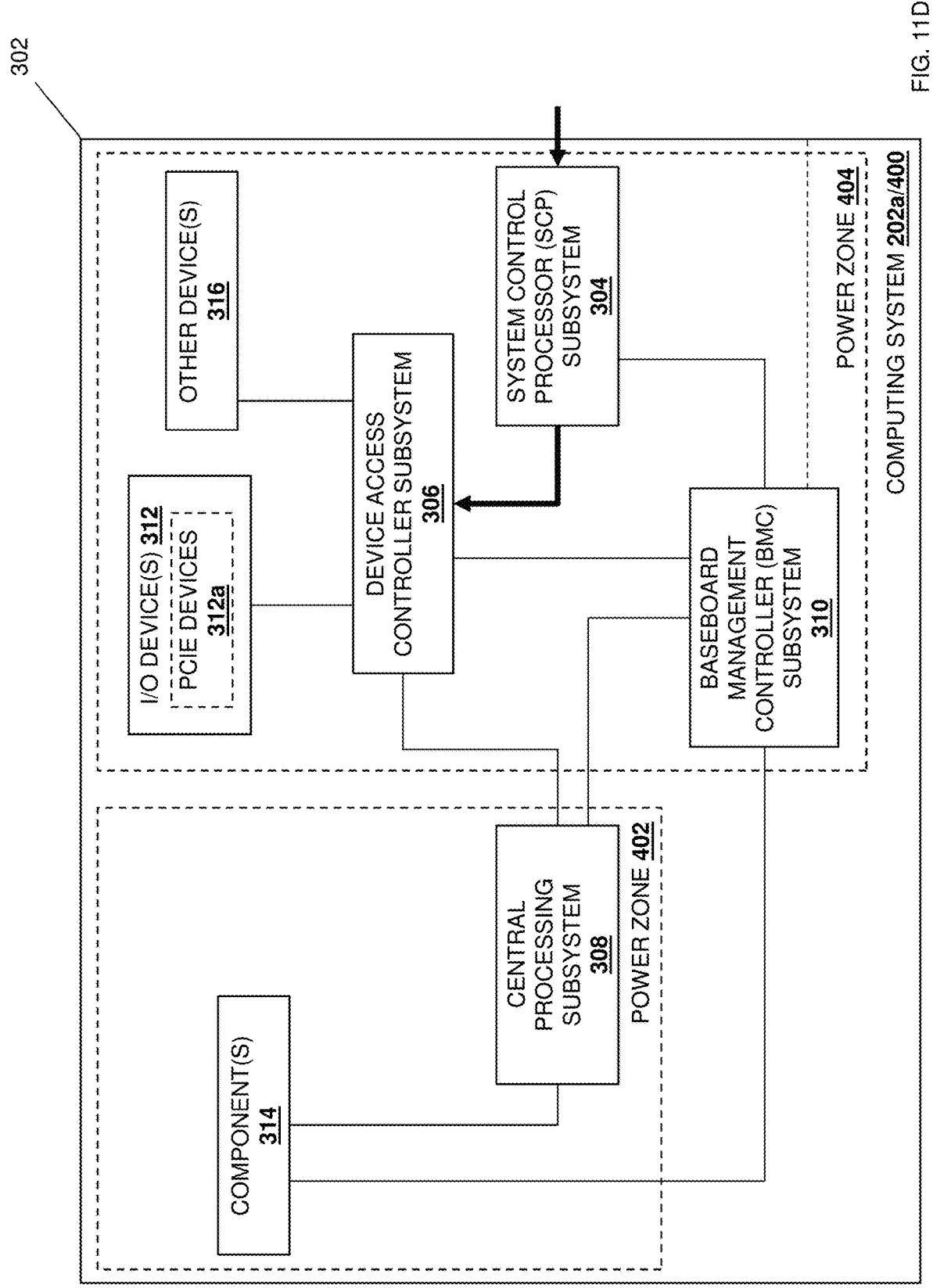
FIG. 11D is a schematic view illustrating an embodiment of the computing system of FIGS. 4A and 4B operating during the method of FIG. 6.
Figure 12:
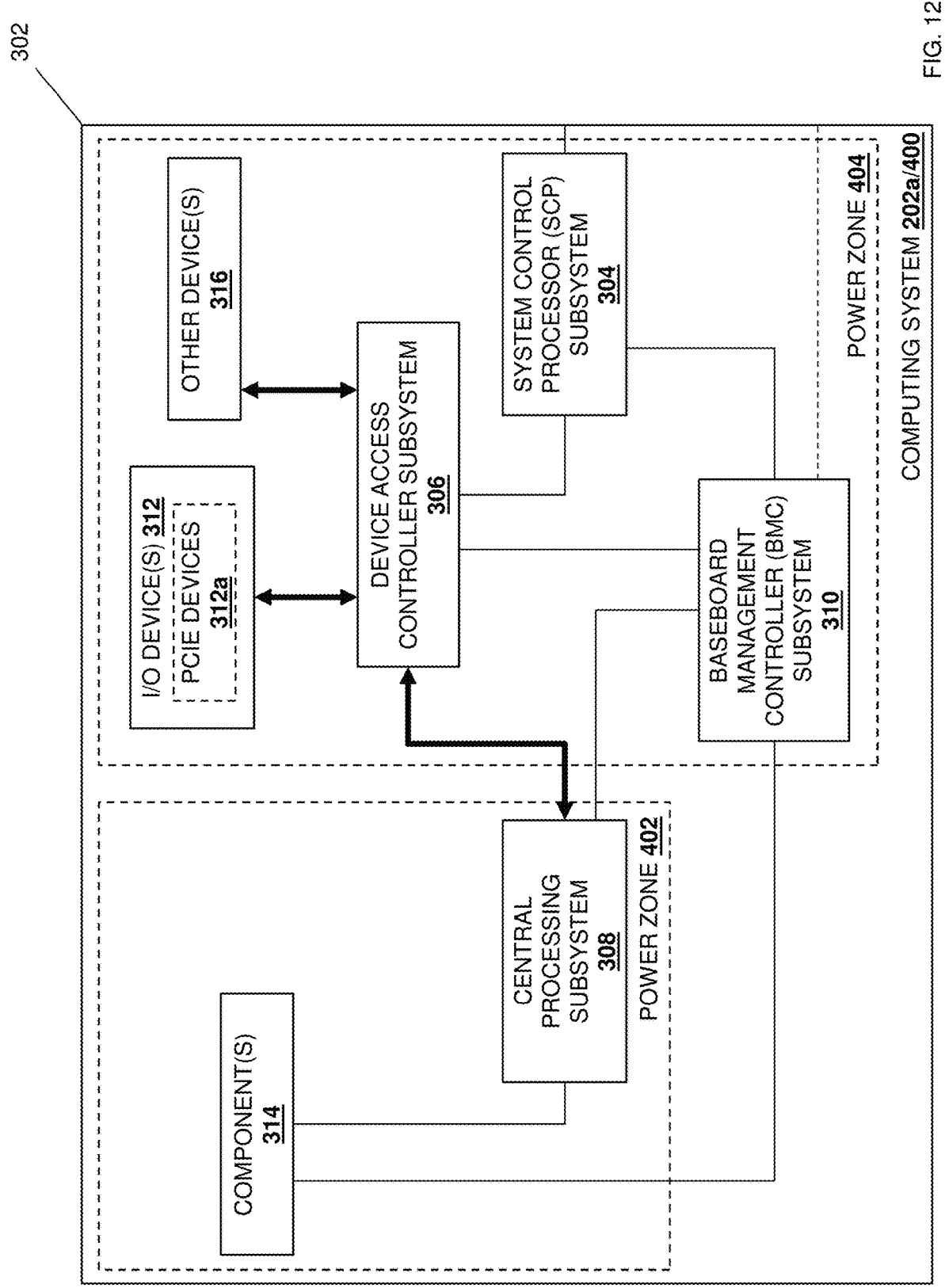
FIG. 12 is a schematic view illustrating an embodiment of the computing system of FIGS. 4A and 4B operating during the method of FIG. 6.

With reference to FIGS. 9A, 9B, and 9C, in response to being configured to perform remote SDS operations, the SDS(s) that were previously performed by the central processing subsystem 308 in the computing system 202a/400 may be restarted on the central processing subsystem 308 in the computing system 202b/400, which may operate to perform remote SDS provisioning operations 900 that may include exchanging SDS communications via the network 204 with the I/O device(s) 312, PCIe device(s) 312a, and/or other device(s) 316 included in the computing system 202a/400, as well as performing any other operations that one of skill in the art in possession of the present disclosure would recognize as providing one or more SDSs. For example, the central processing subsystem 308 in the computing system 202b/400 may transmit SDS communications to the device access controller subsystem 306 in the computing system 202b/400, and the device access controller subsystem 306 in the computing system 202b/400 may forward those SDS communications to the SCP subsystem 304 in the computing system 202b/400 so that the SCP subsystem 304 in the computing system 202b/400 transmits those SDS communications via the network 204 to the computing system 202a/400, as illustrated in FIGS. 9A and 9B. The SCP subsystem 304 in the computing system 202a/400 may then receive those SDS communications and transmit them to the device controller subsystem 306 in the computing system 202a/400, and the device controller subsystem 306 in the computing system 202a/400 may then forward those SDS communications to the I/O device(s) 312, PCIe device(s) 312a, and/or other device(s) 316 included in the computing system 202a/400.

Similarly, the I/O device(s) 312, PCIe device(s) 312a, and/or other device(s) 316 included in the computing system 202a/400 may transmit SDS communications to the device access controller subsystem 306 in the computing system 202a/400, and the device access controller subsystem 306 in the computing system 202a/400 may forward those SDS communications to the SCP subsystem 304 in the computing system 202a/400 so that the SCP subsystem 304 in the computing system 202a/400 transmits those SDS communications via the network 204 to the computing system 202b/400. The SCP subsystem 304 in the computing system 202b/400 may then receive those SDS communications and transmit them to the device controller subsystem 306 in the computing system 202b/400, and the device controller subsystem 306 in the computing system 202b/400 may then forward those SDS communications to the central processing subsystem 308 in the computing system 202b/400.

As will be appreciated by one of skill in the art in possession of the present disclosure, the exchange of SDS communications between the central processing subsystem 308 in the computing system 202b/400 and the I/O device(s) 312, PCIe device(s) 312a, and/or other device(s) 316 included in the computing system 202a/400 may operate to provide the same SDS(s) that were provided by the central processing subsystem 308 In the computing system 202a/400 according to block 602. Furthermore, while the computing system 202b/400 is discussed in the example below as remotely providing the SDS(s) to provide the high availability functionality of the present disclosure, one of skill in the art in possession of the present disclosure will recognize that any other computing systems (e.g., up to 202c and/or 300) may remotely provide the SDS(s) to provide the high availability functionality while remaining within the scope of the present disclosure as well.

Thus, at block 610, the central processing subsystem 308 in the computing system 202b/400 may operate to remote provide one or more SDSs using the I/O device(s) 312, PCIe device(s) 312a, and/or other device(s) 316 in the computing system 202a/400, which one of skill in the art in possession of the present disclosure will recognize may include software defined storage services, software defined processing services, and/or any other SDSs known the art. Furthermore, while described as providing SDSs, one of skill in the art in possession of the present disclosure will recognize that the SDSs discussed herein may be replaced by a variety of applications that utilize devices in a computing system to provide, for example, database services, data analytics, AI training, interference services, and/or any of a variety of other functionality known in the art. As will be appreciated by one of skill in the art in possession of the present disclosure, the provisioning of SDSs by the central processing subsystem 308 in the computing system 202b/400 using the I/O device(s) 312, PCIe device(s) 312a, and/or other device(s) 316 in the computing system 202a allows for the utilization of "content" data (e.g., stored on NVMe storage devices, SAS storage devices, and/or other storage device that may be provided by the PCIe devices 312a/I/O devices 312 in the computing system 202a/400), the utilization of "state" data (e.g., stored on the I/O device(s) 312, PCIe device(s) 312a, and/or other device(s) 316 such as GPUs in the computing system 202a/400), and/or the utilization of any other data in the computing system 202a/400 that would be apparent to one of skill in the art in possession of the present disclosure. As such, the remote provisioning of the one or more SDSs by the computing system 202b using the I/O device(s) 312, PCIe device(s) 312a, and/or other device(s) 316 in the computing system 202a allows the one or more SDS(s) to be provided in the same manner in which they were provided by the computing system 202a.

As will be appreciated by one of skill in the art in possession of the present disclosure, the remote provisioning of the SDS(s) by a second computing system using devices in a first computing system that was previously providing those SDS(s) locally may be performed in a variety of situations. For example, if a central processing subsystem in the first computing system fails or otherwise becomes unavailable such that the SDS(s) being provided by that central processing subsystem become unavailable, the second computing system may be utilized to remotely provision those SDS(s) while the first computing system is power cycled in an attempt to fix its central processing subsystem unavailability. In another example, if a power zone that includes a central processing subsystem in the first computing system fails or otherwise becomes unavailable such that the SDS(s) being provided by that central processing subsystem become unavailable, the second computing system may be utilized to remotely provision those SDS(s) until that power zone is restored.

In another example, if an update is being performed on an operating system (or other software) in the first computing system such that the SDS(s) being provided using that operating system become unavailable, the second computing system may be utilized to remotely provision those SDS(s) until that operating system (or other software) update is completed. In another example, if a reboot of the first computing system is being performed such that the SDS(s) being provided using that first computing system become unavailable, the second computing system may be utilized to remotely provision those SDS(s) until that reboot operation has been completed, which one of skill in the art in possession of the present disclosure will recognize can be a relatively substantial amount of time due to the tendency to perform time-consuming firmware updates when reboot operations are performed (particular when those reboot operations are performed on computing systems that are seldom rebooted). However, while a variety of situations in which remote provisioning of SDSs by a second computing system using devices in a first computing system (which was previously locally providing those SDS(s)) has been described, one of skill in the art in possession of the present disclosure will appreciate that the remote provisioning/expanded availability functionality of the present disclosure will provide benefits in a variety of other situations that will fall within the scope of the present disclosure as well.

The method 600 then proceeds to decision block 612 where it is determined whether the first computing system is available to provide the SDS(s) that became unavailable at decision block 604. Similarly as discussed above for decision block 604, at decision block 612 different devices may operate to directly determine whether the SDS(s) are available via the computing device 202a/400, and any of those direct determinations may result in the SCP subsystem 304 in the computing system 202a/400 determining whether the SDS(s) are available via the computing device 202a/400 at block 612 as well. As such, at decision block 612 the SCP subsystem 304/500 in the computing system 202a/400 may operate to directly determine whether the SDS(s) are available via the computing system 202a/400, the BMC subsystem 310 in the computing system 202a/400 may operate to directly determine whether the SDS(s) are available via the computing system 202a/400 and communicate that to the SCP subsystem 304 in the computing system 202a/400, the management system 206 may operate to directly determine whether the SDS(s) are available via the computing system 202a/400 and communicate that to the SCP subsystem 304 in the computing system 202a/400, or a remote host that is provided by the computing system 202b may operate to directly determine whether the SDS(s) are available via the computing system 202a/400 and communicate that to the SCP subsystem 304 in the computing system 202a/400.

In a specific example, the determination of whether SDS(s) are available via a computing system may include a determination of whether that computing system is ready, capable of, and/or otherwise currently configured to provide those SDS(s). For example, the inability to provide the SDS(s) may have resulted from a hardware failure in the computing system, and the determination of whether the SDS(s) are available at decision block 612 may include determining whether that hardware failure has been repaired and that computing system has been rebooted. However, one of skill in the art in possession of the present disclosure will appreciate that SDS availability on a computing system may be determined in a variety of manners that will fall within the scope of the present disclosure as well.

If, at decision block 612, it is determined that the first computing system is not available to provide the SDS(s) that became unavailable at decision block 604, the method 600 returns to block 610. As such, the method 600 may loop such that the central processing subsystem 308 in the computing system 202b/400 operates to provide the SDS(s) using the devices in the computing system 202a/400 as long as the SDS(s) are not available via the computing system 202a/400. If, at decision block 612, it is determined that the first computing system is available to provide the SDS(s) that became unavailable at decision block 604, the method 600 proceeds to block 614 where a networking subsystem in the first computing system configures the device access controller subsystem to receive SDS communications from the central processing subsystem. As will be appreciated by one of skill in the art in possession of the present disclosure, the performance of SDS(s) using the central processing subsystem 308 in the computing system 202a/400 may once again become available for a wide variety of reasons that will fall within the scope of the present disclosure. For example, the SDS(s) may once again become available via the central processing subsystem 308 in the computing system 202a/400 due to a central processing subsystem recovery that makes the central processing subsystem 308 available, the completion of a computing system reboot that makes the central processing subsystem 308 available, a recovery or other availability of the power zone 402 that makes the central processing subsystem 308 available, and/or any other SDS availability situation that would be apparent to one of skill in the art in possession of the present disclosure.

As such, in some embodiments of decision block 612, the central processing subsystem 308 may become available such that the SDS(s) are available via the computing system 202a/400, and that SDS availability will cause the method 600 to proceed to block 614 where the central processing subsystem 308 in the computing system 202b/400 is stopped from providing the SDS(s) using the devices in the computing system 202a/400, local access to those devices is restored for the central processing subsystem 308 in the computing system 202a/400, and the central processing subsystem 308 in the computing system 202a/400 then begins to again provide those SDS(s). In an embodiment, at block 614, the SCP subsystem 304/500 in the computing system 202a/400 may operate to directly or indirectly configure the device access controller subsystem 306 in the computing system 202a/400 to receive SDS communications from the central processing subsystem 308 in the computing system 202a/400. For example, similarly as discussed above with reference to FIG. 8A, the expanded available computing system engine 504 in the SCP subsystem 304/500 may perform device access controller subsystem configuration operations (similar to the device access controller subsystem configuration operations 800) to directly configure the device access controller subsystem 306 in the computing system 202a/400 by, for example, generating and transmitting device access controller subsystem reconfiguration instructions via the component connections 508b in the communication system 508 and to the device access controller subsystem 306.

In another example, similarly as discussed above with reference to FIG. 8B, at block 614 the expanded available computing system engine 504 in the SCP subsystem 304/500 may perform device access controller subsystem configuration operations (similar to the device access controller subsystem configuration operations 802) to indirectly configure the device access controller subsystem 306 in the computing system 202a/400 by, for example, generating and transmitting device access controller subsystem configuration instructions via the component connections 508b in the communication system 508 and to the BMC subsystem 310 in the computing system 202a/400, which causes the BMC subsystem 310 to perform device access controller subsystem configuration operations 804 to configure the device access controller subsystem 306 accordingly.

In another example, similarly as discussed above with reference to FIGS. 8C and 8D, at block 606 the management system 206 may perform device access controller subsystem configuration operations (similar to the device access controller subsystem configuration operations 806) to configure the device access controller subsystem 306 in the computing system 202a/400 by, for example, generating and transmitting device access controller subsystem configuration instructions via the network 204 and to the SCP subsystem 304/500 in the computing system 202a/400, which causes the SCP subsystem 304/500 to perform device access controller subsystem configuration operations 808 to indirectly configure the device access controller subsystem 306 accordingly (e.g., by forwarding those device access controller subsystem configuration instructions received from the management system 206 to the device access controller subsystem 306).

In another example, similarly as discussed above with reference to FIGS. 8E and 8F, at block 606 a remote host that is provided by the computing system 202b may operate to perform device access controller subsystem configuration operations (similar to the device access controller subsystem configuration operations 810) to configure the device access controller subsystem 306 in the computing system 202a/400 by, for example, generating and transmitting device access controller subsystem configuration instructions via the network 204 and to the SCP subsystem 304/500 in the computing system 202a/400, which causes the SCP subsystem 304/500 to perform device access controller subsystem configuration operations 812 to indirectly configure the device access controller subsystem 306 accordingly (e.g., by forwarding those device access controller subsystem configuration instructions received from the computing system 202b to the device access controller subsystem 306).

However, while several examples of the configuration of the device access controller subsystem 308 are described, one of skill in the art in possession of the present disclosure will appreciate that the device access controller subsystem of the present disclosure (e.g., a fabric switch device) may be configured in a variety of manners that will fall within the scope of the present disclosure as well. Furthermore, while a few specific techniques are described herein for configuring access to devices via the device access controller subsystem, some of the inventors of the present disclosure describe further techniques for configuring access to devices in a computing system that may be utilized along with the present disclosure in U.S. patent application Ser. No. 17/081,808, filed on Oct. 27, 2020, the disclosure of which is incorporate by reference herein in its entirety.

As will be appreciated by one of skill in the art in possession of the present disclosure, at block 614 the device access controller subsystem 308 may be reconfigured to receive SDS communications from the central processing subsystem 308 and transmit those SDS communications to the I/O device(s) 312, PCIe device(s) 312a, and/or other device(s) 316 to provide the SDS(s) as discussed above with reference to block 602. For example, a fabric switch device that provides the device access controller subsystem 308 in the computing system 202a/400 may be configured to receive SDS communications from the central processing subsystem 308 and transmit those SDS communications to the I/O device(s) 312, PCIe device(s) 312a, and/or other device(s) 316 via the fabric. However, while a specific configuration/reconfiguration scenario is described, one of skill in the art in possession of the present disclosure will appreciate how the device access controller subsystem 308 may be configured to provide the functionality in a variety of manners that will fall within the scope of the present disclosure as well.

As discussed above, the I/O device(s) 312, PCIe device(s) 312a, and/or other device(s) 316 may not be configured and/or capable of presenting themselves as more than one device, which requires the reconfiguration of the device access controller subsystem 308 discussed above in order switch access to that device from the SCP subsystem 304/500 to the central processing subsystem 308 in order to enable local access to that device by the central processing subsystem 308. However, as also discussed above, in some embodiments the I/O device(s) 312, PCIe device(s) 312a, and/or other device(s) 316 in the computing system 202a/400 may be configured to present themselves to both the SCP subsystem 304/500 and the central processing subsystem 308 simultaneously such that the reconfiguration of the device access controller subsystem 308 discussed above is not required. For example, any of the I/O device(s) 312, PCIe device(s) 312a, and/or other device(s) 316 may be configured to natively support multiple device presentation (e.g., using device that are natively multi-port or that may be provided multiple ports using PCIe I/O virtualization techniques) that eliminate the need to reconfigure the device access controller subsystem 308 following the determination that the SDS(s) are available via the computing system 202a/400. As such, the configuration of the device access controller subsystem 308 in the computing system 202a/400 to receive SDS communications from the central processing subsystem 308 may be performed prior to determining that the SDS(s) are available via the computing system 202a/400 (i.e., the device access controller subsystem 308 may be configured to receive SDS communications from the central processing subsystem 308 based on the I/O device(s) 312, PCIe device(s) 312a, and/or other device(s) 316 being configured to natively support multiple device presentation as discussed above). The method 600 then returns to block 602 where the central processing subsystem 308 in the computing system 202a/400 operates to provide the SDS(s) similarly as discussed above.

Thus, systems and methods have been described that provide an SCP subsystem in a first server that is configured to enable a path for a second server to devices in the first server that are utilized to provide SDSs, which allows the second server to provide the SDSs using the devices in the first server that were previously used by the first server to provide the SDSs, and eliminates the need to backup data associated with those SDSs and/or rebuild that data on the second server. For example, the expanded availability computing system of the present disclosure may include a first and second server coupled together via a network. The first server includes a fabric switch coupled to devices and a host CPU complex that is configured to provide SDS(s) using the devices via the fabric switch. An SCP subsystem coupled to the fabric switch determines that the at least one SDS is unavailable, configures the fabric switch to receive SDS communications from the SCP subsystem, enables remote access for the second server via the SCP subsystem and through fabric switch to the devices, and transmits SDS communications received from the second server to the devices via the fabric switch so that the second server provides the SDS(s) using the devices via the fabric switch. As such, the first server is provided with expanded availability that enables use of its devices to provide the SDS(s) even when the first server is unable to provide those SDS(s).

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An expanded availability computing system, comprising:
    a second computing system; and
    a first computing system that is coupled to the second computing system via a network, wherein the first computing system includes:
        a device access controller subsystem;
        a plurality of devices that are coupled to the device access controller subsystem;
        a central processing subsystem that is coupled to the device access controller subsystem, wherein the central processing subsystem is configured to provide at least one Software Defined Service (SDS) using the plurality of devices via the device access controller subsystem; and
        a networking subsystem that is coupled to the device access controller subsystem, wherein the networking subsystem is configured to:
            determine that the at least one SDS that was being provided by the central processing subsystem is unavailable;
            configure the device access controller subsystem to receive SDS communications from the networking subsystem;
            enable remote access for the second computing system via the networking subsystem and through device access controller subsystem to the plurality of devices; and
            transmit SDS communications received from the second computing system to the plurality of devices via the device access controller subsystem in order to allow the second computing device to provide the at least one SDS using the plurality of devices via the device access controller subsystem.

2. The system of claim 1, wherein the device access controller subsystem includes a fabric switch device.

3. The system of claim 1, wherein the networking device includes a System Control Processor (SCP) subsystem.

4. The system of claim 1, wherein the networking subsystem is configured to:
    determine that the at least one SDS may be provided by the central processing subsystem subsequent to the at least one SDS becoming unavailable; and
    configure the device access controller subsystem to receive SDS communications from the central processing subsystem in order to allow the central processing subsystem to again provide at least one SDS using the plurality of devices via the device access controller subsystem.

5. The system of claim 1, wherein the networking subsystem is configured to determine that the at least one SDS that was being provided by the central processing subsystem is unavailable by at least one of:
    using direct central processing subsystem/networking subsystem communications to determine that the at least one SDS is unavailable;
    receiving an SDS unavailability communication from a Baseboard Management Controller (BMC) subsystem that is included in the first computing system;
    receiving an SDS unavailability communication from a management system that is coupled to the first computing system via the network;
    receiving an SDS unavailability communication from the second computing system; or
    receiving an SDS unavailability communication from a third computing system that is coupled to the first computing system via the network.

6. The system of claim 1, wherein the networking subsystem is configured to configure the device access controller subsystem to receive SDS communications from the networking subsystem by at least one of:
    generating and transmitting device access controller subsystem configuration communications to the device access controller subsystem;
    generating device access controller subsystem configuration communications from a management system that is coupled to the first computing system via the network, and transmitting the device access controller subsystem configuration communications to the device access controller subsystem; or
    instructing a Baseboard Management Controller (BMC) subsystem that is included in the first computing system to generate and transmit device access controller subsystem configuration communications to the device access controller subsystem.

7. An Information Handling System (IHS), comprising:
    a networking processing subsystem; and
    a networking memory subsystem that is coupled to the networking processing subsystem and that includes instructions that, when executed by the networking processing subsystem, cause the networking processing subsystem to provide an expanded availability computing system engine that is configured to:
        determine that at least one Software Defined Service (SDS), which was being provided by a central processing subsystem that is included in the IHS and coupled to the networking processing subsystem via a device access controller subsystem that is included in the IHS, is unavailable;
        configure the device access controller subsystem to receive SDS communications from the expanded availability computing system engine;
        enable remote access for a second computing system via a network and the expanded availability computing system engine and through the device access controller subsystem to a plurality of devices that are included in the IHS and coupled to the networking processing subsystem via the device access controller subsystem; and
        transmit SDS communications received from the second computing system to the plurality of devices via the device access controller subsystem in order to allow the second computing device to provide the at least one SDS using the plurality of devices via the device access controller subsystem.

8. The IHS of claim 7, wherein the device access controller subsystem includes a fabric switch device.

9. The IHS of claim 7, wherein the networking processing subsystem and the networking memory subsystem are included on a System Control Processor (SCP) subsystem.

10. The IHS of claim 7, wherein the expanded availability computing system engine is configured to:
   determine that the at least one SDS may be provided by the central processing subsystem subsequent to the at least one SDS becoming unavailable; and
   configure the device access controller subsystem to receive SDS communications from the central processing subsystem in order to allow the central processing subsystem to again provide at least one SDS using the plurality of devices via the device access controller subsystem.

11. The IHS of claim 7, wherein the expanded availability computing system engine is configured to determine that the at least one SDS that was being provided by the central processing subsystem is unavailable by at least one of:
   using direct central processing subsystem/networking processing subsystem processing system communications to determine that the at least one SDS is unavailable;
   receiving an SDS unavailability communication from a Baseboard Management Controller (BMC) subsystem that is included in the IHS;
   receiving an SDS unavailability communication from a management system that is coupled to the IHS via the network;
   receiving an SDS unavailability communication from the second computing system; or
   receiving an SDS unavailability communication from a third computing system that is coupled to the IHS via the network.

12. The IHS of claim 7, wherein the expanded availability computing system engine is configured to configure the device access controller subsystem to receive SDS communications from the expanded availability computing system engine by at least one of:
   generating and transmitting device access controller subsystem configuration communications to the device access controller subsystem;
   generating device access controller subsystem configuration communications from a management system that is coupled to the IHS via the network, and transmitting the device access controller subsystem configuration communications to the device access controller subsystem; or
   instructing a Baseboard Management Controller (BMC) subsystem that is included in the IHS to generate and transmit device access controller subsystem configuration communications to the device access controller subsystem.

13. The IHS of claim 7, wherein the expanded availability computing system engine is configured to configure the device access controller subsystem to receive SDS communications from the expanded availability computing system engine prior to determining that the at least one SDS is unavailable.

14. A method for providing an expanded availability computing system, comprising:
   determining, by a networking subsystem in a first computing system, that at least one Software Defined Service (SDS) is unavailable, wherein the at least one SDS was being provided by a central processing subsystem prior to its unavailability, and wherein the central processing subsystem is included in the first computing system and coupled to the networking subsystem via a device access controller subsystem;
   configuring, by the networking subsystem, the device access controller subsystem to receive SDS communications from the networking subsystem;
   enabling, by the networking subsystem, remote access for a second computing system via a network and the networking subsystem and through the device access controller subsystem to a plurality of devices that are included in the first computing system and coupled to the networking subsystem via the device access controller subsystem; and
   transmitting, by the networking subsystem, SDS communications received from the second computing system to the plurality of devices via the device access controller subsystem in order to allow the second computing device to provide the at least one SDS using the plurality of devices via the device access controller subsystem.

15. The method of claim 14, wherein the device access controller subsystem includes a fabric switch device.

16. The method of claim 14, wherein the networking subsystem includes a System Control Processor (SCP) subsystem.

17. The method of claim 14, further comprising:
   determining, by the networking subsystem, that the at least one SDS may be provided by the central processing subsystem subsequent to the at least one SDS becoming unavailable; and
   configuring, by the networking subsystem, the device access controller subsystem to receive SDS communications from the central processing subsystem in order to allow the central processing subsystem to again provide at least one SDS using the plurality of devices via the device access controller subsystem.

18. The method of claim 14, wherein the determining that the at least one SDS that was being provided by the central processing subsystem is unavailable is performed by at least one of:
   using, by the networking subsystem, direct central processing subsystem/networking subsystem communications to determine that the at least one SDS is unavailable;
   receiving, by the networking subsystem, an SDS unavailability communication from a Baseboard Management Controller (BMC) subsystem that is included in the first computing system;
   receiving, by the networking subsystem, an SDS unavailability communication from a management system that is coupled to the first computing system via the network;
   receiving, by the networking subsystem, an SDS unavailability communication from the second computing system; or
   receiving, by the networking subsystem, an SDS unavailability communication from a third computing system that is coupled to the first computing system via the network.

19. The method of claim 14, wherein the configuring the device access controller subsystem to receive SDS communications from the subsystem is performed by at least one of:
   generating and transmitting, by the networking subsystem, device access controller subsystem configuration communications to the device access controller subsystem;
   generating, by the networking subsystem, device access controller subsystem configuration communications from a management system that is coupled to the first computing system via the network, and transmitting the device access controller subsystem configuration communications to the device access controller subsystem; or instructing, by the networking subsystem, a Baseboard Management Controller (BMC) subsystem that is included in the first computing system to generate and transmit device access controller subsystem configuration communications to the device access controller subsystem.

20. The method of claim 14, wherein the configuring the device access controller subsystem to receive SDS communications from the subsystem occurs prior to determining that the at least one SDS is unavailable.

* * * * *